US 8,285,709 B2

United States Patent
Candea et al.

(10) Patent No.: US 8,285,709 B2
(45) Date of Patent: Oct. 9, 2012

(54) HIGH-CONCURRENCY QUERY OPERATOR AND METHOD

(75) Inventors: George Candea, Saint-Sulpice (CH); Neoklis Polyzotis, Santa Cruz, CA (US)

(73) Assignee: Teradata US, Inc., Dayton, OH (US)

( * ) Notice: Subject to any disclaimer, the term of this patent is extended or adjusted under 35 U.S.C. 154(b) by 173 days.

(21) Appl. No.: 12/779,040

(22) Filed: May 12, 2010

(65) Prior Publication Data

US 2010/0293135 A1 Nov. 18, 2010

Related U.S. Application Data

(60) Provisional application No. 61/177,287, filed on May 12, 2009.

(51) Int. Cl.
*G06F 17/30* (2006.01)

(52) U.S. Cl. ........ 707/714; 707/706; 707/707; 707/709; 707/711; 707/712; 707/715; 707/716; 707/717; 707/718; 707/719; 707/721; 707/723; 707/736; 707/758; 707/781; 705/14

(58) Field of Classification Search .................. 707/706, 707/707, 709, 711, 712, 714, 715, 716, 717, 707/718, 719, 721, 723, 736, 758, 781, 999.003, 707/999.004, 999.005; 705/14
See application file for complete search history.

(56) References Cited

U.S. PATENT DOCUMENTS

| 2006/0212350 A1* | 9/2006 | Ellis et al. ..................... 705/14 |
| 2009/0049024 A1* | 2/2009 | Brown et al. ..................... 707/4 |

\* cited by examiner

*Primary Examiner* — Syling Yen
(74) *Attorney, Agent, or Firm* — Raj. Abhyanker, P.C.

(57) ABSTRACT

In one embodiment, a method includes concurrently executing a set of multiple queries, through a processor, to improve a resource usage within a data warehouse system. The method also includes permitting a group of users of the data warehouse system to simultaneously run a set of queries. In addition, the method includes applying a high-concurrency query operator to continuously optimize a large number of concurrent queries for a set of highly concurrent dynamic workloads.

19 Claims, 22 Drawing Sheets

|  | HASH | | | DIM DATA | | |
|---|---|---|---|---|---|---|
| Q1 | | | | | | |
| Q2 | H1 | H2 | H3 | COL1 | COL2 | COL3 |
| Q3 | | | | | | |

↖ IN MEMORY DIMENSION TABLE ENTRY 750

FIGURE 7

SELECT $\mathcal{A}$, $Aggr_1,\ldots,Aggr_k$
FROM F, $D_{d_1},\ldots,D_{d_n}$
WHERE $\bigwedge_{1\leq j\leq n} F \bowtie D_{d_j}$ AND $\bigwedge_{1\leq j\leq n} \sigma_{C_j}(Dd_j)$ AND $\sigma_{C_0}(F)$
GROUP BY $\mathcal{B}$

FIGURE 10

$Q_1$ SELECT $AGGR_1$
FROM F $\tau$, $D_1$ $\delta$, $D_2$ $\delta^1$
WHERE $\tau \bowtie \delta \bowtie \delta^1$ AND $\sigma_{C11}$ ($\delta$) AND $\sigma_{C12}$ ($\delta^1$)

$Q_2$ SELECT $AGGR_2$
FROM F $\tau$, $D_1$ $\delta_1$, $D_2$ $\delta^1$
WHERE $\tau \bowtie \delta \bowtie \delta^1$ AND $\sigma_{C21}$ ($\delta$) AND $\sigma_{C22}$ ($\delta^1$)

TWO SIMPLE STAR QUERIES THAT JOIN A FACT TABLE F WITH TWO DIMENSION TABLES $D_1$ AND $D_2$. THE TWO QUERIES COMPUTE DIFFERENT AGGREGATES AND APPLY DIFFERENT SELECTION PREDICATES ON $D_1$ AND $D_2$.

FIGURE 11

| N | 32 | 64 | 128 | 256 |
|---|---|---|---|---|
| SUBMISSION TIME (SEC) | 2.4 | 2.4 | 2.4 | 2.3 |
| RESPONSE TIME (SEC) | 724.8 | 723.1 | 759.0 | 861.2 |

TABLE 1: THE INFLUENCE OF CONCURRENCY ON QUERY SUBMISSION OVERHEAD

FIGURE 19

| PREDICATE SELECTIVITY (%) | 0.1 | 1 | 10 |
|---|---|---|---|
| SUBMISSION TIME (SEC) | 1.6 | 2.4 | 11.6 |
| RESPONSE TIME (SEC) | 707.2 | 759.0 | 3418.0 |

TABLE 2: THE INFLUENCE OF PREDICATE SELECTIVITY ON QUERY SUBMISSION OVERHEAD

FIGURE 20

| SCALE FACTOR | 1 | 10 | 100 |
|---|---|---|---|
| SUBMISSION TIME (SEC) | 0.4 | 0.7 | 2.4 |
| RESPONSE TIME (SEC) | 18.8 | 105.1 | 759.0 |

TABLE 3: THE INFLUENCE OF DATA SCALE ON QUERY SUBMISSION OVERHEAD

FIGURE 21

HIGH-CONCURRENCY QUERY OPERATOR AND METHOD

CLAIM OF PRIORITY

This disclosure claims priority to a U.S. Provisional Patent Application Ser. No. 61/177,287 filed on May 12, 2009, and titled "High Concurrency Query Operator and Method".

FIELD OF TECHNOLOGY

This disclosure relates to database technology and more particularly to a method and system to optimize a large number of concurrent queries in a database system through a high-concurrency query operator.

BACKGROUND

A data warehouse (DW) may store an organization's data and may provide reporting and analysis facilities. Businesses and governments alike may rely heavily on DW technology in order to glean information from vast amounts of data and to make strategic decisions. The importance of data analytics in this context are substantial, and some state that the recent (2008-2009) financial meltdown may be due in part to insufficient visibility into the true value of mortgage-backed securities, e.g., a problem of poor data analysis.

The DW may be implemented using specialized database systems, relational databases, object-relational databases and/or other types of databases. When an execution plan for each query in the data warehouse is generated independently, and when the queries are executed independently, a contention of resources in a computer system may result. This contention of resources in the data warehouse may cause a database and the computer system to perform inefficiently. The inefficient performance of the computer system may cause unacceptable delays in receiving a response from the database, thereby restricting an ability of users to run multiple queries concurrently.

Today's real-world applications may utilize support for many concurrent users. Moreover, it may be desired to limit a query latency increase caused by going from one query to several concurrent ones. A DW client may specifically state that increasing concurrency from 1 query to 40 should not increase the latency of any given query by more than 6 times. Data warehousing environments of large organizations may be used to routinely support hundreds of concurrent queries.

A general-purpose DW system may have a limited capability to meet these goals. Adding a new query today may have unpredictable effects and/or predictably negative ones. For instance, when going from 1 to 256 concurrent queries, the query response time in a widely used commercial DBMS may increase by an order of magnitude and PostgresSQL's may increase by two orders of magnitude. When queries take hours or days to complete, they may be less able to provide real-time analysis and, depending on the isolation level, they may need to operate on hours-old and/or days-old data. This situation may lead to "workload fear": users of the DW may be prohibited from submitting ad-hoc queries and may execute only sanctioned reports. Hence in order to achieve better scalability, organizations may break their data warehouse into smaller data marts, perform aggressive summarization, and batch query tasks.

These measures, however, may delay the availability of answers, restrict severely the types of queries that may be run (and consequently the richness of the information that may be extracted) and contribute to an increased maintenance cost. In effect, the available data and computation resources may end up being used inefficiently, which may prevent the organization from taking full advantage of their investment. Workload fear may act as a barrier to deploying novel applications that use the data in imaginative ways.

This phenomenon may not be due to faulty designs, but rather because some existing database systems may have been designed for a particular case. Workloads and data volumes, as well as hardware architectures, may differ from the particular case. Conventional database systems may employ the query-at-a-time model, where each query may be mapped to a distinct physical plan. This model may introduce contention when several queries are executing concurrently, as the physical plans compete in mutually-unaware fashion for access to the underlying I/O and computational resources. As a result, concurrent queries may result in random I/O; but when the DW holds 1 petabyte, even a query that touches only 0.01% of the highly-indexed database may still retrieve on the order of $10^9$ tuples, thus potentially performing a crippling number of random I/O operations. Performance of more random I/O operations may result in a slower database system.

SUMMARY

Disclosed are a method and a system to optimize a large number of concurrent queries in a database system through a high-concurrency query operator.

In one aspect, a method includes concurrently executing a set of multiple queries, through a processor, to improve a resource usage within a data warehouse system. The method also includes permitting a group of users of the data warehouse system to simultaneously run a set of (ad-hoc) queries. In addition, the method includes applying a high-concurrency query operator to continuously optimize a large number of concurrent queries for a set of highly concurrent dynamic workloads.

In another aspect, a pipeline system to evaluate concurrent queries includes a dimension preprocessor to perform updates to augment at least one dimension table with a selection predicate. In addition, the system includes a fact preprocessor to read fact data and to augment the fact data with necessary metadata. The system further includes at least one dimension filter to retrieve the fact data from an input queue to probe a corresponding dimension hash table to identify a joining dimension data, and to annotate the fact data augmented by the fact preprocessor. The system also includes a distributor to receive the annotated fact data from the at least one dimension filter and to distribute copies of the annotated fact data into queries' result sets.

In yet another aspect, a method of evaluating concurrent queries in the pipeline includes perform updates through a dimension preprocessor to augment at least one dimension table with a selection predicate. In addition, the method includes reading a fact data and augmenting the fact data with necessary metadata through a fact preprocessor. The method further includes retrieving fact data through at least one dimension filter from an input queue to probe a corresponding dimension hash table to identify a joining dimension data, wherein the dimension filter to annotate the fact data augmented by the fact preprocessor. The method also includes receiving through a distributor, the annotated fact data from the at least one dimension filter and distributing copies of the annotated fact data into queries' result sets.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which:

FIG. 7 illustrates the in-memory dimension table entry 750, augmented for in-flight GROUP BY, according to an embodiment.

FIG. 10 illustrates a class of SQL star queries.

FIG. 11 illustrates the operation of the pipeline and the basic ideas behind the design of the high-concurrency query operator using a simple workload.

FIG. 19 illustrates that the time to submit a query may not depend on the number of active queries in the system.

FIG. 20 illustrates that the time to submit a new query may not be proportional to s.

FIG. 21 illustrates that the overhead of a query submission in the system may drop relative to the query response time as sf increases.

Figure 1:
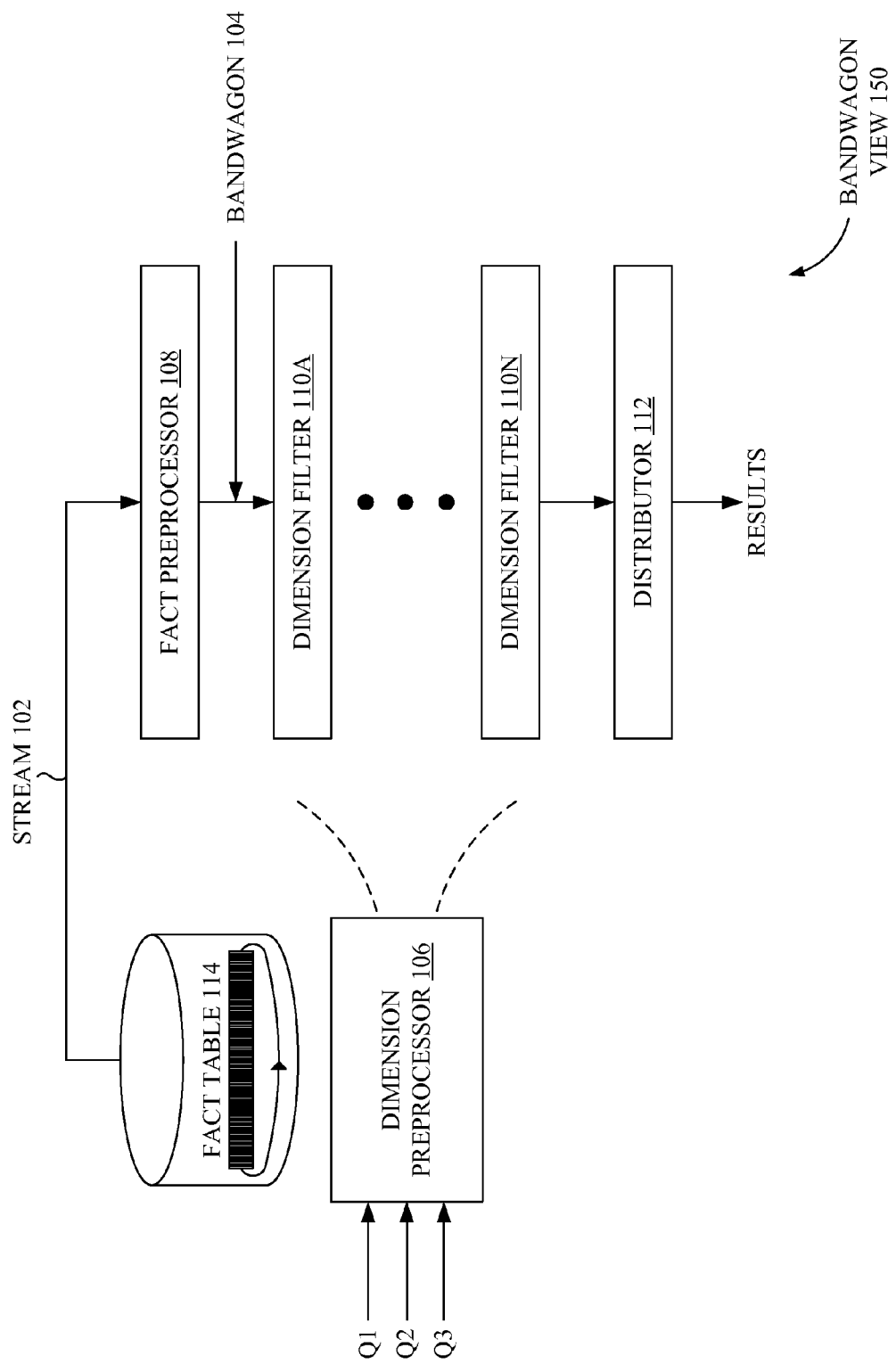
FIG. 1 illustrates a bandwagon view of the Cjoin pipeline which describes a concept to stream the fact tuples from disk sequentially and form a bandwagon, according to one embodiment.

Other features of the present embodiments will be apparent from the accompanying drawings and from the detailed description that follows.

DETAILED DESCRIPTION

Example embodiments, as described below, may be used in database technology and more particularly may be applied to a method and system to optimize a large number of concurrent queries in a database system through a high-concurrency query operator. Although the present embodiments have been described with reference to specific example embodiments, it will be evident that various modifications and changes may be made to these embodiments without departing from the broader spirit and scope of the various embodiments.

The method and system discussed here may be targeted at large-scale data warehouses. These may be characterized today by workloads heavily biased toward reads, with updates often occurring as high-volume periodic tasks. A typical DW may organize (but may not be limited to) data in a star and/or snowflake schema, and queries may tend to contain deep, multi-level joins between a fact table and several dimensions. Moreover, each query may touch a large amount of data.

Disclosed is a methodology of concurrent execution of multiple queries that improves resource usage and allows users to run multiple ad-hoc queries simultaneously. In particular, a physical query operator CJOIN is described. A query processing architecture is disclosed that may enable a DW system to scale to hundreds of concurrent users, issuing ad-hoc queries and/or receiving real-time answers. This query processing architecture may enable ways of using data warehouses, in which users shed the workload fear and experiment freely with the data analysis, drill arbitrarily deep, broaden queries, etc. More concretely, a physical operator called Cjoin is described that may evaluate concurrent queries more efficiently. The design of Cjoin may achieve a high degree of work sharing and may utilize the characteristics of modern DW platforms, which may include many-core systems, fast sequential scans, and large main memories.

Using Cjoin as the basis, a query processing engine may be built that scales to highly concurrent dynamic workloads. The query engine may employ a single physical plan that may be "on" continuously and may be optimized continuously based on run-time statistics. A new query may latch on a single plan at any point in time, and it may immediately start sharing work with concurrent queries in the same plan. This aggressive sharing may be a significant part of the architecture.

Cjoin may achieve substantial improvement over some commercial and research systems. In an embodiment, for 256 concurrent queries, Cjoin outperforms major commercial and open-source systems by 10×-100× on the SSB benchmark. In the embodiment, for 32 concurrent queries, Cjoin may outperform them by 5% to 5×. In addition, in the example embodiment, Cjoin query response time may increase by less than 30% as the degree of concurrency increases from 1 to 256 queries.

Figure 5:
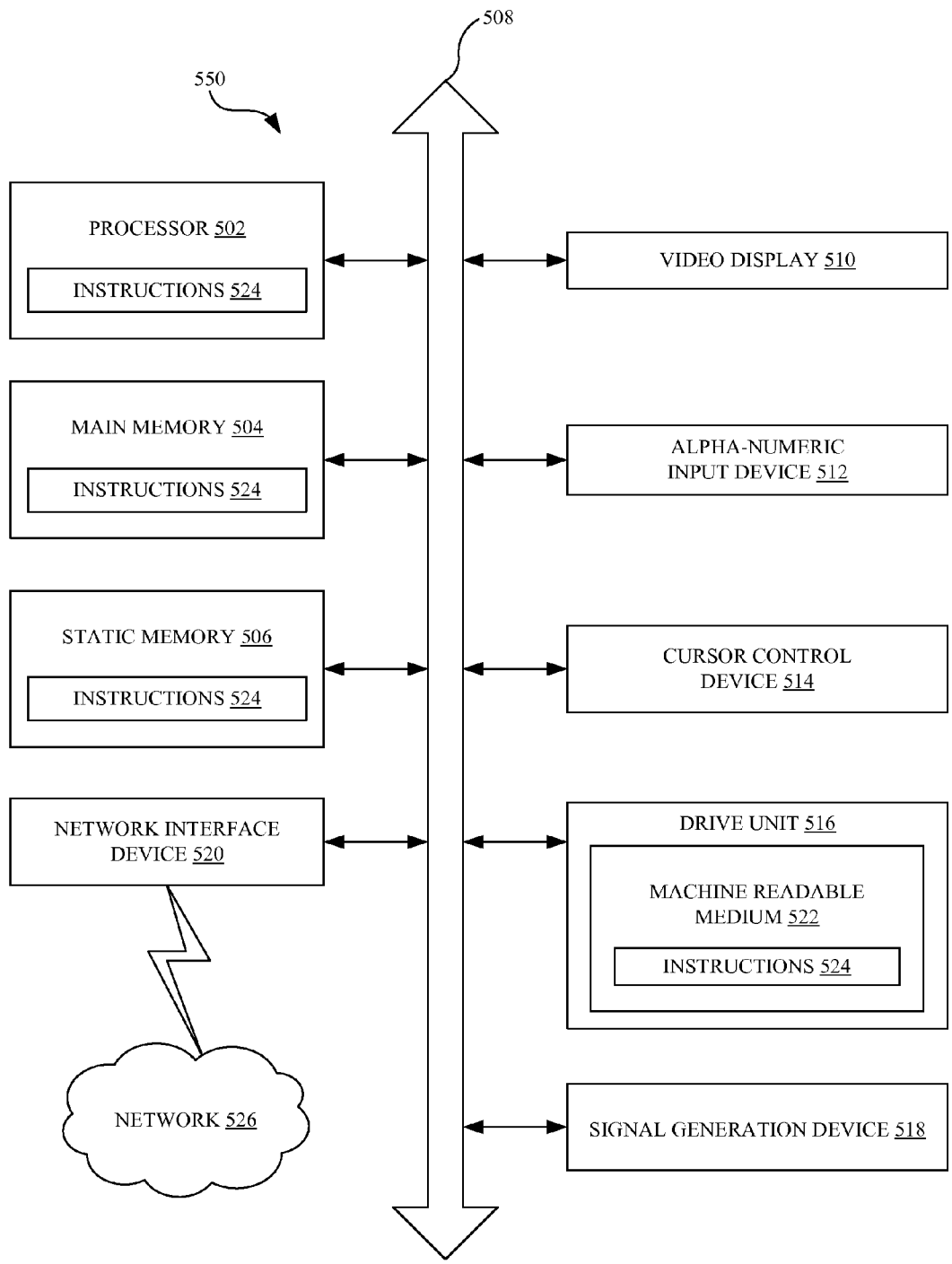
FIG. 5 is a diagrammatic system view of a data processing system in which any of the embodiments disclosed herein may be performed, according to one embodiment.

FIG. 5 is a diagrammatic system view 500 of a data processing system in which any of the embodiments disclosed herein may be performed, according to one embodiment. Particularly, the diagrammatic system view 500 of FIG. 5 illustrates a processor 502, a main memory 504, a static memory 506, a bus 508, a video display 510, an alpha-numeric input device 512, a cursor control device 514, a drive unit 516, a signal generation device 518, a network interface device 520, a machine readable medium 522, instructions 524, and a network 526, according to one embodiment.

The diagrammatic system view 500 may indicate a personal computer and/or the data processing system in which one or more operations disclosed herein are performed. The processor 502 may be a microprocessor, a state machine, an application specific integrated circuit, a field programmable gate array, etc. (e.g., Intel® Pentium® processor). The main memory 504 may be a dynamic random access memory and/or a primary memory of a computer system.

The static memory 506 may be a hard drive, a flash drive, and/or other memory information associated with the data processing system. The bus 508 may be an interconnection between various circuits and/or structures of the data processing system. The video display 510 may provide graphical representation of information on the data processing system. The alpha-numeric input device 512 may be a keypad, a keyboard and/or any other input device of text (e.g., a special device to aid the physically handicapped).

The cursor control device 514 may be a pointing device such as a mouse. The drive unit 516 may be the hard drive, a storage system, and/or other longer term storage subsystem. The signal generation device 518 may be a bios and/or a functional operating system of the data processing system. The network interface device 520 may be a device that performs interface functions such as code conversion, protocol conversion and/or buffering required for communication to and from the network 526. The machine readable medium 522 may provide instructions on which any of the methods disclosed herein may be performed. The instructions 524 may provide source code and/or data code to the processor 502 to enable any one or more operations disclosed herein.

The Target Domain

DW Model. A data warehouse that may organize information using a star schema and other commonly used schemas in the data warehousing industry.

A fact relation F may be linked through foreign keys to d dimension relations $D1, \ldots, Dd$. F may be too large to fit into main memory and may be considerably larger than the dimension tables. The method and system described here may also be applicable to all other kinds of table that may be structurally similar to the fact and dimension tables and may be queried using star-like join queries.

The method and system disclosed may not make any assumptions as to the physical storage of the relations in the warehouse, e.g., whether they may be partitioned or indexed. The warehouse may support a workload of SQL queries coupled with periodic updates. The concurrency control protocol may provide snapshot isolation guarantees.

The class of SQL star queries that conform to the template of FIG. 10 is distinguished. Symbols A and B denote subsets of attributes from the referenced tables, and $Aggr1, \ldots, Aggrk$ may be any aggregate functions including standard SQL aggregate functions, e.g., MIN, MAX, AVG, etc. The WHERE clause may specify the join of the fact relation F to the dimension tables and a conjunction of selection predicates.

The method and system disclosed may not restrict any predicate $c_j$, $0 \leq j \leq n$, other than that the evaluation of the predicate involves solely the tuple variable in the query associated with table $D_j$. Predicate $c_j$ may be set to TRUE if the query does not have a predicate on the corresponding table. The method and system disclosed may cover all the classes of such queries that can be described by $k \diamond 0$ OR $A \diamond \emptyset$ where $\emptyset$ represents an empty set.

The method and system disclosed may be described as but not limited to using star queries. These queries may be submitted by users individually or act as sub-plans of more complex queries.

In an embodiment, the method and system provide a means of increasing query throughput and gracefully adjusting a query response time with increasing number of concurrent queries. For example, the system may limit thrashing and introduce predictability in response times. In the embodiment, query response time may be determined primarily by the characteristics of the query rather than by the number of concurrent queries. The method and system may be used to process other operations other than star queries, such as concurrently updated statements and other SQL queries. The method and system may possess Cjoin functionality in addition to the functionality of a DBMS.

In an embodiment, the method and system uses a Cjoin (Concurrent Join). In the embodiment, Cjoin is a physical operator that allows high-concurrency in queries that involve one or more JOIN operators.

In one embodiment, an environment in which a user may issue queries is a data warehouse that organizes information in a star schema. In a star schema, a fact relation F may be linked through foreign keys to d dimension relations $D1, \ldots, Dd$. The fact and dimension relations may or may not be partitioned or indexed. The workload in such environment may consist of queries in SQL or other query languages and periodic update of data.

In an embodiment, Cjoin answers a multiple concurrent queries while scanning a fact table once. Some non-Cjoin systems may read a fact table separately for each query, which may result in repeated operations across multiple queries. Cjoin may limit such redundancy of work, compute additional results in a shorter time, and may allow large number of concurrent queries.

For example, running several Online analytical processing (OLAP) queries concurrently may bog some databases down. In such scenarios, Cjoin may help to significantly reduce the cost of running such queries. Also when a number of OLAP queries may be already running some queries, Cjoin may help in reducing incremental costs of additional concurrent queries.

It should be noted that fact data (stored in fact tables) may be a data point associated with a time, which may allow the data to be processed independently of other fact or dimension data. Independent data may further be processed and stored without regard to the order in which it is acquired from a source. Examples of fact data may include system logs, bank transaction records, activity at an ATM, and temperature data taken at specific times. Each of these examples of fact data may be processed and stored in a database without regard to the original order in which the information is obtained from a source.

Dimension data (stored in dimension tables) may be information associated with other data that affects how it is processed and stored in a database. The sequence in which dimension data is processed may also affect how it may be stored and analyzed. Dimension data may be the result of an analysis, or it may be a characteristic associated with a person, object, or event. Dimension data may also lack time information needed to perform a subsequent analysis. Examples of dimension data may include a customer name, a city name, a measurement, a summary of transactions, a current account balance, and/or an analysis of demographics at a particular location and time.

In an example embodiment, consider a star schema with one fact table 114 (fact) and 4 dimension tables (dim1, dim2, dim3, and dim4). As a running example of queries Q1, Q2, Q3 submitted concurrently:

| | |
|---|---|
| Q1: | SELECT dim1.B, dim2.C |
| | FROM fact, dim1, dim2 |
| | WHERE fact.A=dim1.id AND fact.B=dim2.id |
| | AND dim1.A<5 AND dim2.B=2 |
| Q2: | SELECT dim2.B |
| | FROM fact, dim2, dim4, dim5 |
| | WHERE fact.B=dim2.id AND fact.D=dim4.id AND |
| | fact.E=dim5.id AND dim4.B>0 AND dim4.C<8 |
| Q3: | SELECT dim3.B, dim3.D |
| | FROM fact, dim1, dim3 |
| | WHERE fact.A=dim1.id AND fact.C=dim3.id |
| | AND dim1.A<5 AND dim3.B>60 |

A query like Q1 may be executed in two ways: (1) Join fact, dim1, dim2, then select tuples based on whether dim1.A<5 AND dim2.B=2 is satisfied; and/or (2) Select tuples from dim1 that satisfy dim1.A<5, select tuples from dim2 that satisfy dim2.B=2, then join the fact table 114 (of FIG. 1) with these tuple sets respectively. A tuple may be a sequence (e.g., an "ordered list") of a specific number of values, called the components of the tuple. These components can be any kind of mathematical objects, where each component of a tuple is a value of a specified type.

Methods of Work Sharing

Multi-Query Optimization. Multi-query optimization may identify common sub-expressions within a batch of queries that may be optimized together and generates physical plans that share the common computation. This approach may require queries to be submitted in batches, which may be incompatible with ad-hoc decision-support queries. Moreover, common computation may be factored only within the batch of optimized queries and thus it may not be possible to share work with queries that may be already executing. The method and system described may share work among the set of currently executing queries regardless of when they were submitted and without requiring a batch submission.

Operator Sharing. One possible system architecture method may enable work sharing at run-time. For example, QPipe employs an operator-centric approach, where each operator, e.g., hash join, sort, or sequential scan, may act as a mini query engine that services several concurrent queries. This design may enable an operator to examine holistically the requests of concurrent queries and identify on-the-fly any operator-specific computation that may be shared. A hash join operator, for instance, may share the build phase of a relation that participates in different hash-joins in several queries. Empirical results suggest that this design may scale well to tens of complex queries. The method and system discussed here may also rely on work sharing in order to scale to many more concurrent queries.

In another example, the Redbrick DW, a shared scan operator may be used to share disk I/O among multiple scan operations executing concurrently on multiple processors. The in-memory data and the state of other operators may not be shared. Shared memory scans may have been investigated as a specific form of work sharing in multi-core systems. The main idea may be to schedule concurrent queries carefully so as to coordinate tuple accesses in the processor's cache. This work may target main-memory databases and may thus be applied only if the warehouse is memory resident. The approach may also be based on a form of scan sharing, but it may target the case of large warehouses where the fact relation cannot fit in main memory.

Finally, the concept of work sharing may have been investigated in the context of streaming database systems. By sharing work (or a state) among continuous-query operators, a streaming DBMS may maintain a low per-tuple processing cost and thus may handle a large number of continuous queries over fast streams. These techniques may be developed in the context of streaming data and thus may not be applied directly to the environment that was targeted.

The method and system may incorporate some of the elements from continuous query processing, which in turn may allow a transfer of a technique from a streaming database to a DW setting.

Materialized Views. Materialized views may enable explicit work sharing, by caching the results of sub-expressions that appear in concurrently executing queries. The selection of materialized views may typically be performed off-line by examining a representative workload and by identifying common sub-expressions. However, capturing a representative workload may be a challenging task in the context of ad-hoc decision-support queries, due to the volatility of the data and the high diversity of the queries.

Constant Time Query Processing. A proposed query processing architecture, named BLINK, may achieve a constant response time for the type of queries considered in the work. The idea may be to run each query using the same plan, namely, a single pass over a fully de-normalized, in-memory fact table, thus incurring more or less a substantially similar execution cost.

The method and system described here may enable predictable execution times for star-like queries. In an embodiment, the method and system differ from other methods in several ways, including: (a) the database may not be assumed to be memory resident; (b) the fact table may not be required to be de-normalized; and (c) the method and system may directly support high query concurrency rather than targeting the execution of a single query at a time. In addition, the method and system may share disk I/O, computation, and in-memory data across multiple in-flight concurrent join queries.

Notation $Q_s$ may denote the set of concurrent star queries that may be being evaluated. Each query may be assigned a unique positive integer identifier, and $Q_i$ may denote the query with id i. These identifiers may be specific to Cjoin and may be assigned when queries are registered with the operator. Also, an identifier may be reused after a query finishes its evaluation. The maximum query id in $Q_s$ is denoted as $maxId(Q_s)$. The relationship $maxId(Q_s) \geq |Q_s|$ may apply in the general case, since query identifiers may not be required to be consecutive. Moreover, $maxId(Q_s)$ may be bounded by a system parameter maxConc that limits the total number of concurrent queries.

$C_{ij}$ may denote a predicate in user query $Q_i$ that may be applicable to dimension table $D_j$. In other words, the selection predicate may be placed by $Q_i$ on a dimension table $D_j$ that it references. It may be assumed that $c_{ij} \equiv TRUE$ if no explicit predicate is placed. Also, ci0 may be defined similarly with respect to the fact table F. Finally, b may denote a bit-vector of bounded length, and b[l] may denote the l-th bit. The symbol 0 may denote the bit vector with all bits set to 0.

Method and System Overview

Figure 12A:
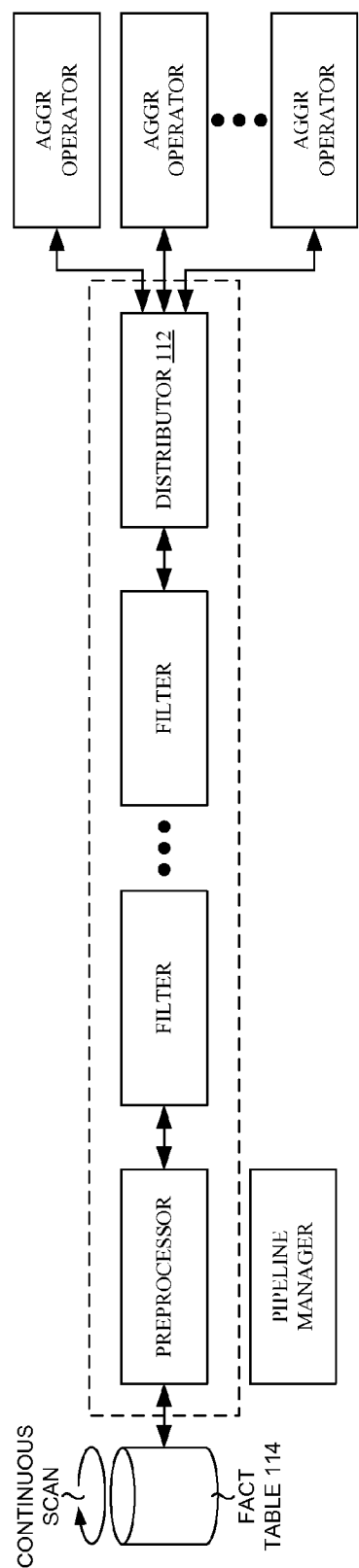
FIG. 12(a) illustrates the general architecture of the pipeline.

Cjoin may leverage the observation that star queries have a common structure, namely they may filter the fact table through dimension predicates, and this may offer an opportunity for substantial work sharing. In an example embodiment, the general architecture of Cjoin pipeline may be shown as in FIG. 12(a). As shown, the operator may comprise a pipeline of components that may receive its input from a continuous scan of the fact table and pipes its output to aggregation operators (either sort-based or hash-based) that compute the query results. In between, the fact tuples may be processed through a sequence of Filters, one for each dimension table, where each Filter encodes the corresponding dimension predicates of all queries in $Q_s$. Cjoin may therefore share I/O and computation among all queries in $Q_s$. The continuous scan may imply that the operator is always "on", e.g., a new query Q may be registered with the operator at any point in time. The Preprocessor may mark the point in the scan where Q enters the operator and then signals the completion of Q when the scan wraps around at that same point. This design may turn the fact table in a "stream" which may be filtered continuously by a dynamic set of dimension predicates.

Figure 12B:
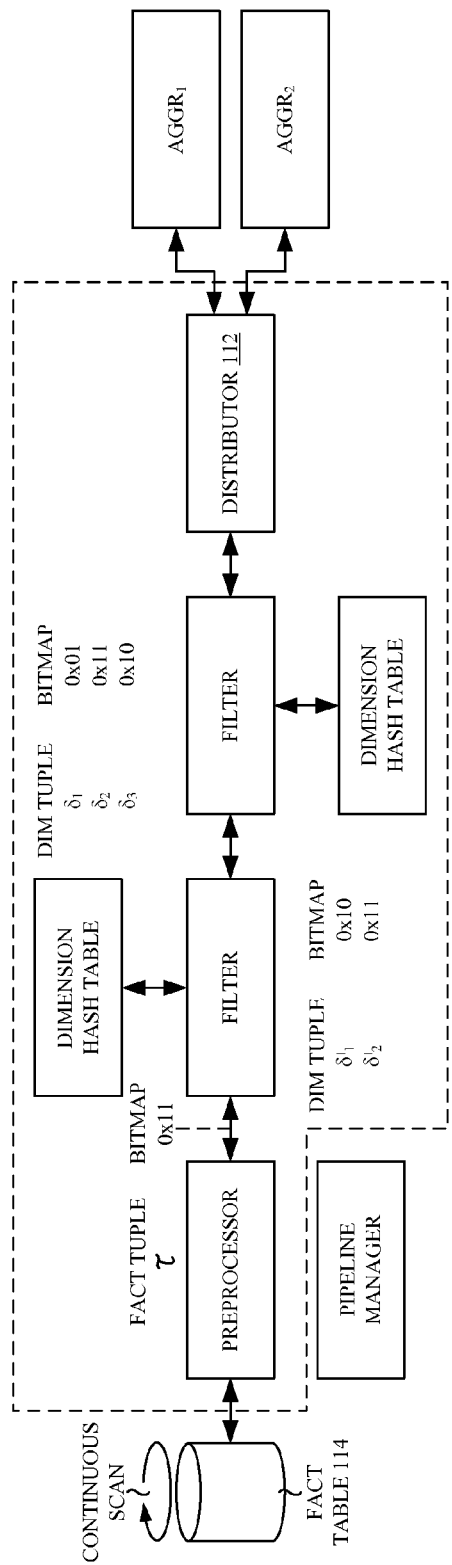
FIG. 12(b) illustrates a possible pipeline for the workload according to one embodiment.

The operation of the pipeline and the basic ideas behind the design of Cjoin may be illustrated using the simple workload shown in FIG. 11, according to one embodiment. FIG. 12(b) shows a possible Cjoin pipeline for this workload, according to one embodiment. The following paragraphs describe the functionality of each component for this specific example.

The Preprocessor may receive tuples from the continuous scan and forward them to the remainder of the pipeline. Each fact tuple τ may be augmented with a bit-vector $b_\tau$ that contains one bit for each query in the workload. In this example, the bit-vector may consist of two bits such that $b_\tau[1]=b_\tau[2]=1$. This may signify that, initially, every fact tuple may be relevant for both queries $Q_1$ and $Q_2$.

The Distributor may receive the fact tuples that may be relevant for at least one query in the current workload. Given an input fact tuple τ, the Distributor examines its bit-vector bτ and routes it to the aggregation operators of query $Q_i$ if $b_\tau$[i]=1.

A Dimension hash table may store the tuples of a specific dimension table that satisfy the predicates of the current queries. In this case, it may be assumed that the predicates of $Q_1$ select exactly two tuples $\delta_1$ and $\delta_2$ from table $D_1$ and one tuple $\delta_2'$ from $D_2$. Accordingly, $Q_2$ selects tuples $\delta_2$ and $\delta_3$ from $D_1$ and tuples $\delta_1'$ and $\delta_2'$ from $D_2$. Each stored dimension tuple δ may be augmented with a bit-vector $b_\delta$ whose length is equal to the bit-vector $b_\tau$ of fact tuples, with the following interpretation: $b_\delta[i]=1$ if the dimension tuple satisfies the predicates of query $Q_i$. For instance, the bit-vector for tuple δ1 is set as $b_{\delta 1}[1]=1$ and $b_{\delta 1}[2]=0$. FIG. 12(b) may illustrate the bit-vectors for all the tuples in the example.

A Filter may retrieve fact tuples from its input queue and may probe the corresponding dimension hash table to identify the joining dimension tuples. Given a fact tuple τ, the semantics of the foreign key join may ensure that there is exactly one dimension tuple δ that corresponds to the foreign key value. If δ is loaded in the dimension hash table, then its bit-vector $b_\delta$ may be combined (using AND) with the bit-vector bτ of τ. Otherwise, bτ may be set to 0. The Filter may forward τ to its output only if $b_\tau \neq 0$ after the combining, e.g., only if the tuple is still relevant to at least one query. Otherwise, the tuple may be discarded. In this example, the first Filter outputs a tuple τ only if it joins with one of $\delta_1, \delta_2,$ or $\delta_3$. The second Filter may forward a fact tuple only if it joins with one of $\delta_1'$ or $\delta_2'$. Since the two Filters work in sequence, τ may appear in the output of the second Filter only if its dimension values satisfy the predicates specified by $Q_1$ or $Q_2$.

The Pipeline Manager may regulate the operation of the pipeline. This component may be responsible for registering new queries with Cjoin and for cleaning up after registered queries finish executing. Another important function may be to monitor the performance of the pipeline and to optimize it on-the-fly to maximize query throughput. For this reason and others mentioned below, it may be desirable for Pipeline Manager to operate in parallel to the main pipeline, so this component may have its own execution context (e.g., a separate thread or process).

In an embodiment, one basic idea behind Cjoin is the that fact tuples flow from the continuous scan to the aggregation operators, being filtered in between based on the predicates of the dimension tables. At a high level, this may be similar to a conventional plan that would employ a pipeline of hash join operators to join the fact table with the dimension tables. However, in the embodiment, Cjoin may share the fact table scan among all queries, may filter a fact tuple against all queries with a single dimension table probe, and may store the union of dimension tuples selected by queries. Therefore the fundamental difference to conventional plans may be that Cjoin evaluates all queries concurrently in a single plan that shares I/O, computation and data. The method and system may also differ from previous operator-centric designs (e.g. QPipe), in that it may take advantage of the semantics of star queries to provide a much tighter degree of integration and sharing. For instance, QPipe may simulate two hash join operators with different state of each query, whereas in the proposed invention there may be a single operator for all concurrent queries.

The example above illustrates one possible Cjoin pipeline for a specific workload, and other possible uses of the disclosed method and system may have different levels of performance. For instance, it may be possible to change the order in which the Filters are applied. In addition, the Filter operators may be run in parallel using a variable degree of parallelism, e.g., the first Filter may employ two parallel threads while the second Filter may have just one thread.

FIG. 1 illustrates a bandwagon view 150 of the Cjoin pipeline which describes a concept to stream 102 the fact tuples from disk sequentially and form a bandwagon 104, according to one embodiment. The bandwagon 104 passes by the dimension filters 110A-110N. A dimension filter is associated with each dimension table and it annotates the tuples according to their join properties. All dimension tables may be loaded and kept in memory in the form of a hashtable. A lookup key ki for this hashtable may be the key involved in the corresponding foreign key constraint (e.g., a hash of that key).

FIG. 1 also illustrates a dimension preprocessor 106 which may perform updates on the in-memory dimension hashtables when a new query arrives, according to the embodiment. The fact preprocessor 108 may read the fact tuples and may augment them with necessary metadata. Each dimension filter 110A to 110N may annotate fact tuples as they pass by. Then, in FIG. 1, the distributor 112 may receive the annotated tuples and distribute copies of the tuples into queries' result sets.

Query Processing

Dimension Hash Tables

Each dimension table $D_j$ that is referenced by at least one query may be mapped to a hash table $HD_j$ in the Cjoin operator. $HD_j$ stores the tuples of $D_j$ that may be selected by at least one query in the workload. More formally, a tuple $\delta \in D_j$ may be stored in $HD_j$ if and only if there exists a query $Q_i$ that references $D_j$ and δ satisfies $c_{ij}$. Tuple δ is also associated with a bit-vector $b_\delta$ of length $maxId(Q_s)$ that determines the queries that select δ. The contents of the bit-vector may be defined as follows: $b_\delta[i]=0$ if i does not correspond to a query in $Q_s$, 1 if $Q_i$ references $D_j$ and δ satisfies $c_{ij}$, 0 if $Q_i$ references $D_j$ and δ does not satisfy $c_{ij}$, 1 if $Q_i$ does not reference $D_j$.

The last case inserts an implicit TRUE predicate for a query $Q_i$ that does not reference the dimension table. The reason may be that $Q_i$ does not filter fact tuples based on $D_j$, so implicitly it may select all the fact tuples in $D_j$. The hash table also may record a single complementary bitmap $b_{Dj}$ defined as follows: $b_{Dj}[i]=1$ if $Q_i$ does not reference $D_j$ and $b_{Dj}[i]=0$ otherwise. Essentially, $b_{Dj}$ may be the bitmap assigned to any tuple that does not satisfy any of the predicates in $Q_s$ and hence is not stored in $HD_j$.

HDj may store only those dimension tuples which are selected by at least one query in the workload, and each such tuple may be stored exactly once regardless of how many queries select it. Moreover, each tuple may be augmented with a single bit-vector of size maxId($Q_s$), which is a moderate memory overhead. Given that the dimension tables may tend to grow at a much slower rate than the fact table (e.g., by a logarithmic rate), it may be reasonable to expect that the hash tables fit in main memory for modern hardware configurations. As a concrete example, TPC-DS (a decision support benchmark from TPC) may employ 2.5 GB of dimension data for a 1 TB warehouse, whereas a high-end workstation can be equipped with 16 GB of main memory.

Figure 2:
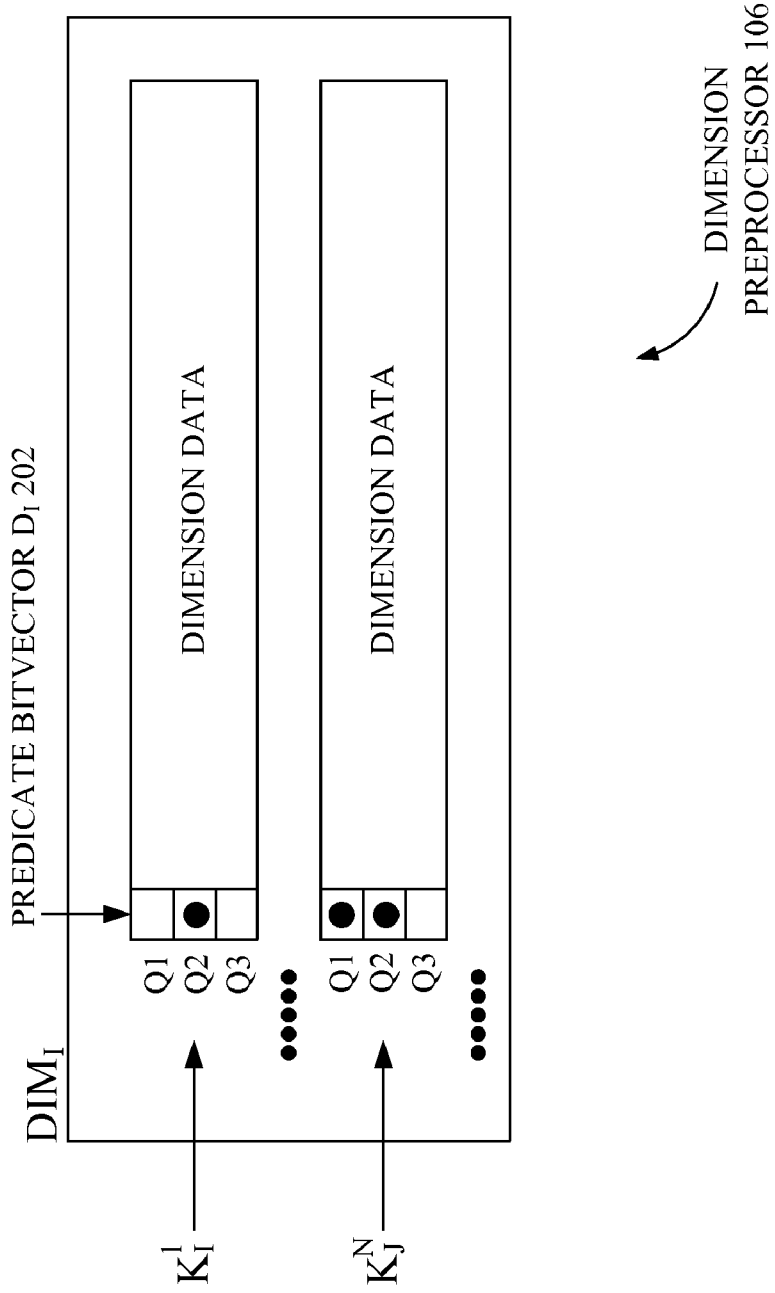
FIG. 2 illustrates that the dimension preprocessor, according to one embodiment.

FIG. 2 illustrates that the dimension preprocessor 106 (as previously described in FIG. 1) may augment each dimension table with a selection predicate, according to an embodiment. For example, the in-memory structure for each dimension tuple in each dimension table may be augmented with a selection predicate bitvector 202 as illustrated in FIG. 2). The bitvector 202 may have maxConc bits, corresponding to a maximum number of concurrent queries. When a new query arrives, the dimension preprocessor 106 may propagate information about the query's selection predicate to all dimension tuples. Bitvector $P[dim_i][k^j_i]$ corresponds to tuple with key $k^j_i$ in dimension table $dim_i$. The bit corresponding to $Q_i$ in $P[dim_i][kj_i]$ is set by the preprocessor if and only if: (1) $Q_i$'s selection predicate includes $dim_i$ and dimension tuple $<dim_i: k^j_i>$ satisfies the selection predicate, or (2) $Q_i$'s selection predicate does not include di.

Another way to view these bitvectors is that, if the bit for $Q_i$ is not set in $P[dim_i][k^j_i]$, then it may mean that the tuple that joins with $dim_i$ on key $k^j_i$ should not appear in $Q_i$'s result set, because it does not satisfy the selection predicate. This is why dimension tables that do not appear in the selection predicate may have their bits set on all tuples.

Taking the example of FIG. 2 with i=1, tuple $<dim_i:k^1_1>$ does not satisfy any of the selection predicates but, since $Q_2$ does not have $dim_1$ in its selection predicate, the $Q_2$ bit is set to 1 for all of $dim_1$'s tuples. Tuple $<dim_1:k''_1>$ satisfies only $Q_1$'s selection predicate, hence $P[dim_1][k''_1][Q_1]$ is set.

The hashtables may have an efficient way to move from one entry to the next, so that every time a new query arrives, the corresponding predicate bitvectors can be rapidly updated in memory. Given that the dimension tables may change slowly, a static structure (such as sparse arrays) may be ideal for the implementation of dimension hashtables. This may improve cache hit rate due to prefetching.

Alternatively, the predicate bitvectors could be structures that are not contiguous with the dimension tuples, but rather independent and include a pointer to the corresponding tuples. Since the content of the dimension tuples may not be read during the join (only during preprocessing and in the distribution phase), such a split data layout may actually improve hit rates in both L1 and L2 cache.

Assume there are 8-byte keys and a user wants to support 1000 parallel queries, then each predicate bitvector may add 1000 bits of overhead (125 bytes) per dimension tuple. If there are 10 GB of 1 KB-long dimension tuples on a worker, it means that there may be 107 dimension tuples in total on that worker, so 125×107=1.25 GB of bitvector overhead is added beyond the 10 GB already required by the in-memory hashtables. For example, workers may be expected to have at least 32 GB of RAM.

Preprocessing, as described here, may not work for predicates that span multiple dimension tables. Such queries may be rejected from CJOIN because they may be an exception. For example, dimension tuples in a star schema may not have significant number of attributes that can be compared to each other, assuming that dimension tuples may not need to be removed frequently. Addition of new tuples may be acceptable. If frequent removal is to be supported, then a marker may be chosen to indicate tuples in the dimension tables that have been removed.

Processing Fact Tuples

The processing of a fact tuple τ through the Cjoin pipeline may include the use of the Preprocessor. The Preprocessor may attach to τ a bit-vector bτ of length maxId($Q_s$) that traces the relevance of the tuple to different queries. This bit-vector may be modified as τ is processed by Filters and it may be used in the Distributor to route τ to aggregation operators. The bit-vector may be initialized based on the predicates placed on the fact table, as follows: $b_τ[i]=1$ if $Q_i \in Q_s$ and τ satisfies $c_{i0}$, and $b_τ[i]=0$ otherwise. After $b_τ$ is initialized, the Preprocessor forwards τ to its output queue if bτ is not equal to 0. If $b_τ$ is equal to 0, τ may be safely dropped from further processing, as it may be guaranteed to not belong to the output of any query in $Q_s$. Computing bτ may involve evaluating a set of predicates on τ, and an efficient evaluation mechanism may be employed to ensure that the preprocessor does not become the bottleneck.

The tuple τ may pass next through the sequence of filters. Consider one such filter and assume that it corresponds to dimension table $D_j$. Let δ be the joining dimension tuple for τ. The Filter may probe $HD_j$ using the foreign key of τ and computes a filtering bitvector, denoted as $b_{τ⋈HDj}$, that reflects the subset of queries that select δ through their dimension predicates. Thus, by ANDing $b_{τ⋈HDj}$ and $b_τ$, the Filter may potentially reduce the subset of queries for which τ is relevant.

The Filter may join τ with $D_j$ with respect to all the queries in the workload by performing a single probe to $HD_j$. If the updated bτ vector is 0 then the fact tuple may be safely dropped from further processing (since it may not belong to the output of any query in $Q_s$), otherwise it may be passed to the output of the Filter. As an optimization, it may be possible to avoid completely the probing of $HD_j$ by checking first whether $b_τ$ AND $b_{Dj}$ is 0. In that case, τ may not be relevant to any queries that reference $HD_j$ and may be simply forwarded to the next filter.

The filtering bit-vector may be computed as follows. If the probe finds δ in $HD_j$ then $b_{τ⋈HDj}=b_δ$, similar to the example of FIG. 12. Otherwise, $b_{τ⋈HDj}$ may be set to $b_{Dj}$, vector of any tuple that may not be stored in $HD_j$. Taking into account the definitions of $b_δ$ and $b_{Dj}$, the following key property for the filtering bit-vector may be asserted: $b_{τ⋈HDj}[i]=1$ if and only if either $Q_i$ references $D_j$ and δ is selected by $Q_i$, or $Q_i$ does not reference table $D_j$. Accordingly, $b_τ$ AND $b_{τ⋈HDj}$ may result in a bit-vector that reflects accurately the relevance of τ to workload queries up to this point.

This property may be formalized as follows.

: Theorem 1

Let $\{D_{d1}, \ldots, D_{dm}\}$ be the set of dimension tables corresponding to the first m Filters in the Cjoin pipeline, m≧1.

Assume that a tuple τ appears in the output of the last Filter. Then, it holds that $b_\tau[i]=1$ if and only if $Q_i \in Q_s$ and τ satisfies the predicates on $Q_i$ on the fact table and joins with dimension tuples in $\{D_{d1}, \ldots, D_{dk}\}$ that also satisfy the predicates of $Q_i$.

Tuple τ may eventually reach the Distributor if its bitvector is nonzero after its processing through all the Filters. Given that the Filters cover all the dimension tables referenced in the current workload, Theorem 1 may guarantee that $b_\tau[i]=1$ if and only if τ satisfies all the selection and join predicates of $Q_i$. Thus the Distributor routes τ to the aggregation operator (shown in FIGS. 12(a) and 12(b)) of each query $Q_i$ for which $b_\tau[i]=1$.

The aggregation operator may directly extract any needed fact table attributes from τ. If the operator needs to access the attributes on some dimension $D_j$, then it may use the foreign key in τ to probe for the joining dimension tuple. A more efficient alternative may be to attach to τ memory pointers to the joining dimension tuples as it is processed by the Filters. More concretely, let δ be a tuple of $D_j$ that joins to τ and assume that $Q_i$ references $D_j$. Based on the definition of $HD_j$, it may be possible to show that δ may be in $HD_j$ when τ may be processed through the corresponding Filter and may remain in memory until τ reaches the Distributor. This may make it possible to attach to τ a pointer to δ after $HD_j$ is probed, so that the aggregation operator may have access to all the needed information.

Fact Tuple Preprocessing

CJOIN may satisfy multiple concurrent queries with one scan of the fact table (e.g., the fact table 114 of FIG. 1). Therefore, a bandwagon is set up to carry tuples from the fact table (e.g., the fact table 114 of FIG. 1) on disk to the dimension tables. The fact table (e.g., the fact table 114 of FIG. 1) can be scanned continuously in a circular fashion to generate a bandwagon of fact tuples that are sent to a fact preprocessor 108 illustrated in FIG. 1 and in FIG. 3.

Figure 3:
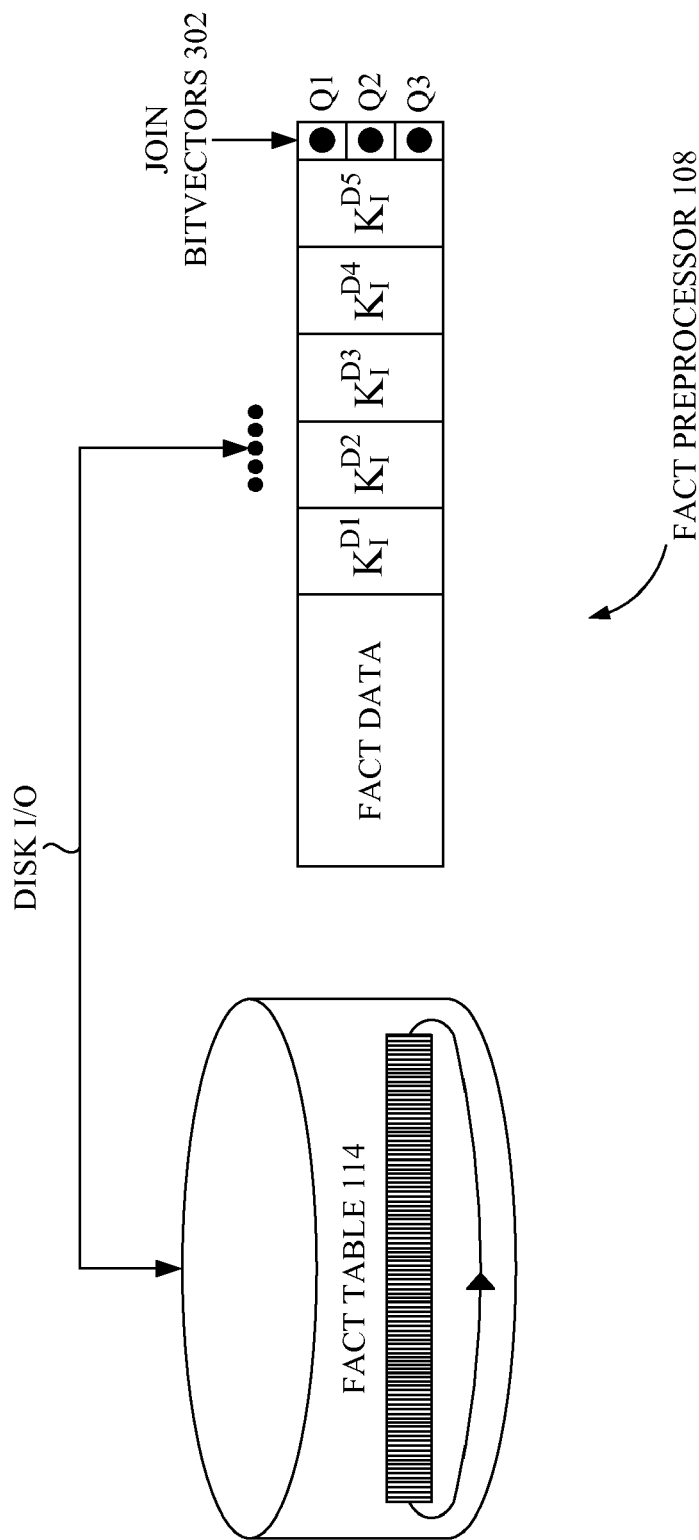
FIG. 3 illustrates that the fact preprocessor (e.g., the fact preprocessor 108 of FIG. 1) may augment fact tuples on the bandwagon with join bitvectors 302.

In FIG. 3, the fact preprocessor (e.g., the fact preprocessor 108 of FIG. 1) may augment fact tuples on the bandwagon with join bitvectors 302 of FIG. 3. Each fact tuple may be augmented with a bit vector of maxConc bits, initially all set to 1. This bitvector may be called a join bitvector, and fact tuple j's join bitvector can be noted by JV[j]. The bitvector may record the join status of the given fact tuple, such that after the fact tuple was processed against all dimension tables (see next section), the following property may hold: bit JV[j][$Q_i$] may be set iff, for each dimension table di involved in $Q_i$'s selection predicate, fact tuple j joins with a tuple in di that satisfies the selection predicate. In other words, if JV[j][$Q_i$] is set, then fact tuple j may belong in the result set for $Q_i$.

For example, if a design is to support 1000 concurrent queries, then the join bitvector may be 1000 bits (125 bytes), which may double the in-memory size of a typical fact tuple. However, given that fact tuples may be short-lived in memory (since they may be continuously scanned off the disk), this may not be a problem. The fact preprocessor (e.g., the fact preprocessor 108 of FIG. 1) may be the first stage in the bandwagon (FIG. 1).

Depending on how data is represented on disk, some hashing and/or swizzling may be necessary when streaming the tuples into the preprocessor. The keys in the fact tuples may be generated (at load time) locally at the workers that store them, in such a way that they are consecutive integers starting at 1. This may make their use as indexes into arrays straightforward. When fact tuples need to be moved from one worker to another, these keys could be regenerated upon the load at the other worker (expensive), and/or can be assigned specific offsets (e.g., intervals of generatable keys) to each worker, and then the worker-generated keys may not overlap.

If CJOIN is implemented as an external operator using COPY OUT, then it might be possible to modify COPY OUT such that the resulting set of tuples has the space for bitvectors preallocated. The alternative of storing this space on disk may/may not be attractive. Another alternative may be to store the bitvectors in separate structures, as suggested for dimension tables.

Dimension Filters

Figure 4:
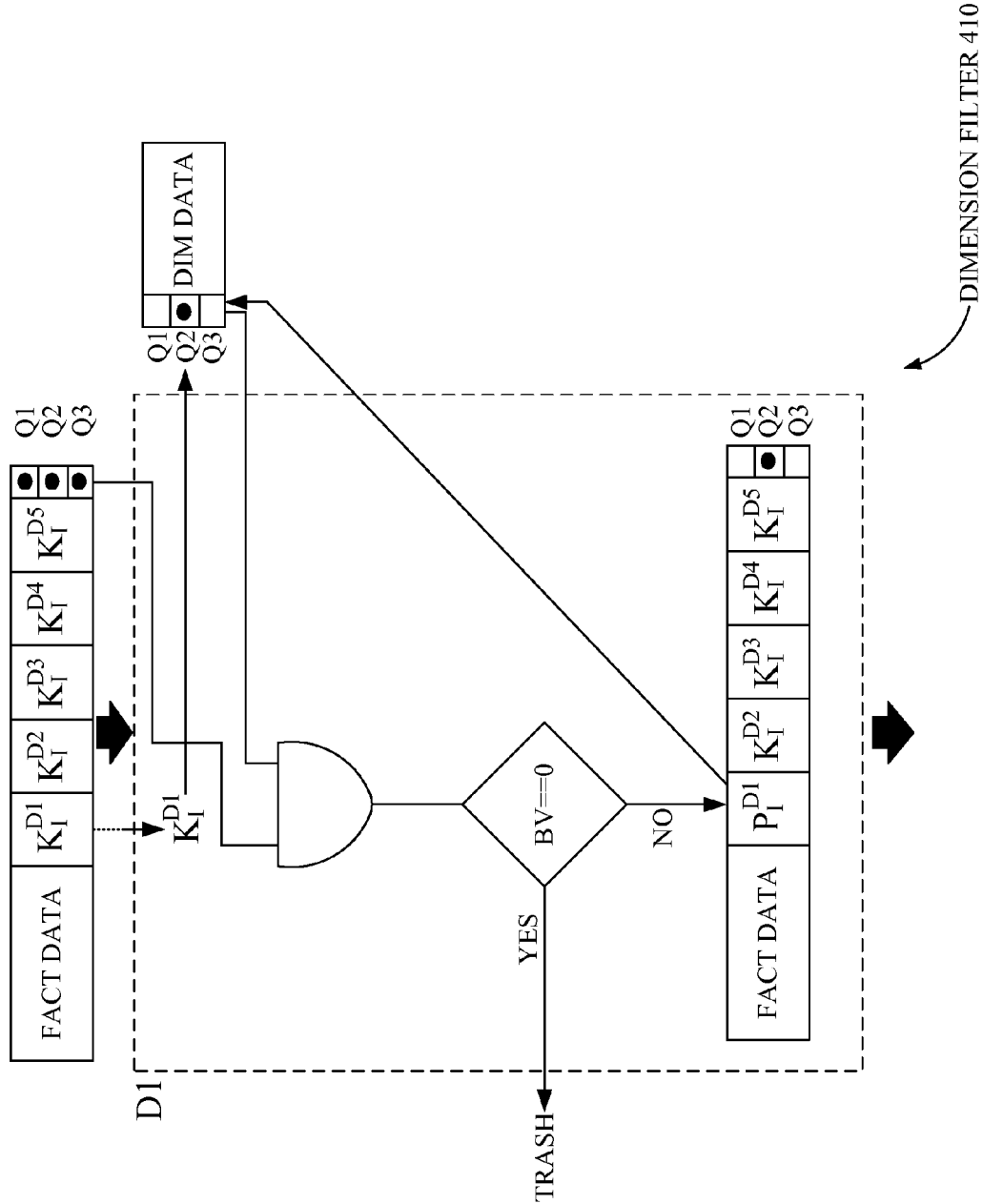
FIG. 4 illustrates the dimension filter 410 for D1, according to an embodiment.

The CJOIN bandwagon may go through a set of dimension filters (e.g., dimension filters 110A-110N of FIG. 1) after it has left the fact preprocessor (e.g., the fact preprocessor 108 of FIG. 1). There may be one dimension filter per dimension table, and each fact tuple may visit each filter once. FIG. 4 illustrates the dimension filter 410 for D1, according to an embodiment. The filter 410 of FIG. 4 may use the key from the fact tuple to look up the dimension tuple that it joins with, and then may perform a bitwise AND of the fact tuple's join bitvector with the dimension tuple's predicate bitvector. The resulting bitvector may have the following property: Bit $Q_i$ is set iff no dimension filter visited so far has decided that this fact tuple cannot join with a corresponding dimension tuple that satisfies the selection predicate for $Q_i$.

If the bitvector has all bits set to zero, then this tuple may not go into any query's result set, so it may be discarded by the filter. For the filter 410 of FIG. 4 to operate as described here, the selection predicate may be in the form of a conjunction of the selection predicates in each dimension. In the running example, there are only conjunctions in these predicates. In the general case, De Morgan's Laws may need to be used to convert selection predicates into conjunctions prior to preprocessing them.

The Distributor

The end of the bandwagon has a tuple distributor (e.g., distributor 112 of FIG. 1) that may decide which tuples belong to which query's result set. Given the property of the join bitvector, this may be simple: if the $Q_i$ bit is set after having visited all dimension filters (e.g., dimension filters 110A-110N of FIG. 1), then the fact tuple may be joined with the dimensions that correspond to $Q_i$ belongs in $Q_i$'s result set. The distributor (e.g., distributor 112 of FIG. 1) may also in charge of deciding when a query's result set is complete. This may occur whenever a query has had the opportunity to consider all the fact tuples. Given that queries can enter the system at different points in time, the distributor (e.g., distributor 112 of FIG. 1) may keep track, for each query, of the first fact tuple ID it has seen on behalf of each query. This may accomplished with a table as shown in FIG. 6.

Figure 6:
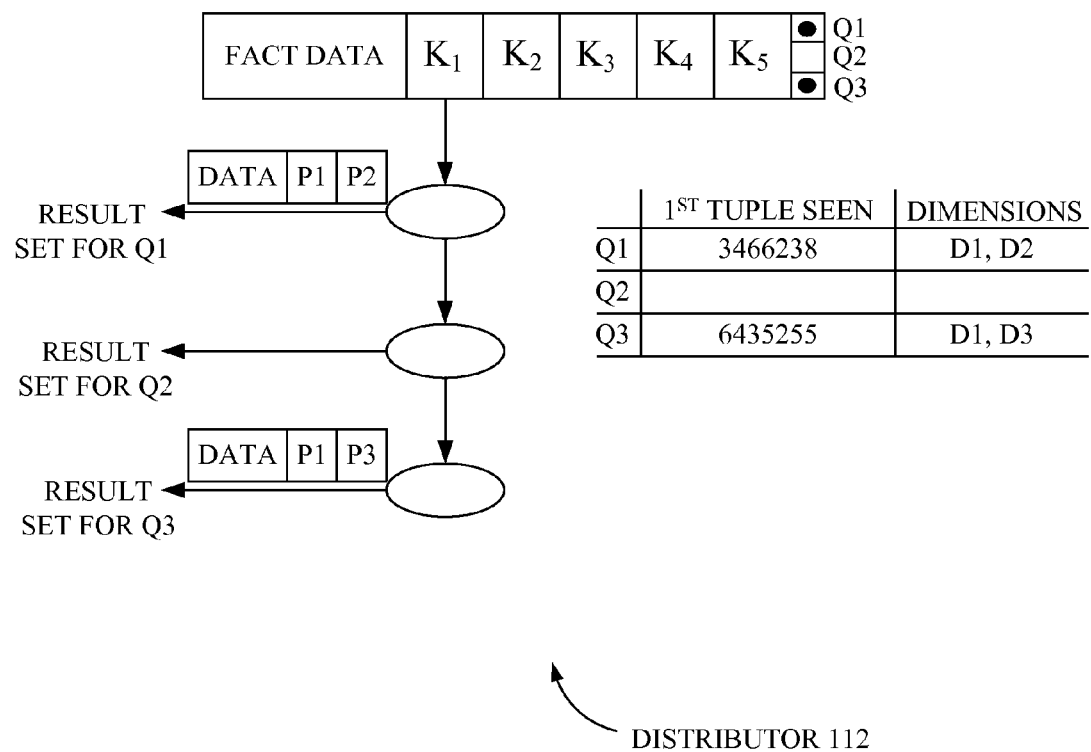
FIG. 6 illustrates an exploded view of the tuple distributor (e.g., the distributor 112 of FIG. 1), according to an embodiment.

FIG. 6 illustrates an exploded view of the tuple distributor (e.g., the distributor 112 of FIG. 1), according to an embodiment. When the distributor encounters a fact tuple whose ID equals the first-tuple-seen for a query $Q_i$, then it may know $Q_i$ has seen all fact tuples, so the entry in the table is zeroed out and the result set is flushed to the queen. It may also make sense to clear the $Q_i$ bit in all predicate bitvectors, depending on implementation. The distributor 112 may need to discard the straggler tuples (e.g., those tuples that were still in the dimtab pipeline at the time the distributor 112 realized the result set was complete). The 1st-tuple-seen entry for $Q_i$ may be initialized again whenever a query $Q_i$ enters the system and all the preprocessing is done. An alternate design may be for the distributor 112 to initialize the entry whenever it sees the first tuple that belongs to $Q_i$'s result set, but this may be inefficient—$Q_i$ may have seen many fact tuples that were filtered out before a fact tuple actually made it to the end of the bandwagon.

Finally, the distributor 112 may need to know which of the pointers in the processed fact tuple to follow. This may be given by a bitvector associated with each query, in which the i-th bit being set indicates that dimension table di is relevant to this query. When a new query comes in, the bits in the dimension hashtables may have to be updated once again. Batch queries may be chosen for a heavy load, so as to amortize the memory walk across multiple queries.

In-Flight GROUP BY

If the queries involve GROUP BY statements on columns only (e.g., GROUP BY A,B but not GROUP BY 2*A+B), then the distribution can be augmented and achieve increased parallelism in grouping the fact tuples. The in-memory dimension table entries may also be augmented with hashes of the individual columns, as shown in FIG. 7.

FIG. 7 illustrates the in-memory dimension table entry 750, augmented for in-flight GROUP BY, according to an embodiment. When an incoming query $Q_i$ performs a GROUP BY column COLj of a dimension table, hashes on COLj may be checked to see if they have already been computed. If not, the hash of COLj may be computed and store it as Hj in each tuple entry of the corresponding in-memory dimension table. These hashes may stay unused until the final distribution stage. At that point, the group each fact tuple belongs to may be computed (see FIG. 7).

Figure 8:
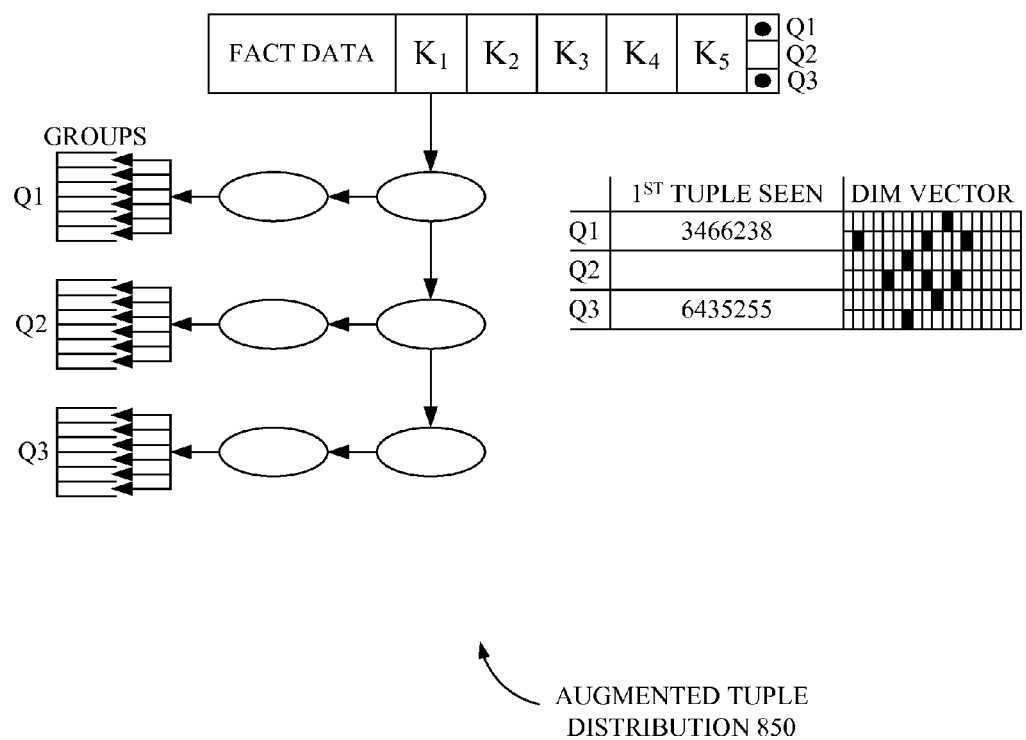
FIG. 8 illustrates the augmented tuple distribution 850 for GROUP BY, according to an embodiment.

FIG. 8 illustrates the augmented tuple distribution 850 for GROUP BY, according to an embodiment. The pointer in each fact tuple may be used to locate the dimension tuples that join, and then extract the hashes of the columns on which $Q_i$ is grouping. The concatenation of these hashes may identify the group into which the tuple is placed.

In an embodiment, the metadata may be augmented and kept on the side with a dimension vector for each query (see FIG. 8). This vector may be a concatenation of n vectors, where n is the number of dimension tables. Each such "sub-vector" may consist of m 2-bit values, where m is the maximum number of columns in any given dimension table. For a query $Q_i$, if the vector value at $(d-1)*n+i$ may be 00, then it may mean that grouping is not done by column i in dimension table d. If it is 01, then grouping may be done by that column. If it is 10, then grouping may not be done but a projecting may be done on the column. And finally, if it is 11, then both a group by it and project it are performed. Note that this scheme can be used even for queries that GROUP BY 2*A+B, but some of the resulting groups would have to be aggregated further.

Cost of Cjoin Query Processing

In an embodiment, the Cjoin operator may efficiently share I/O, computation and data among a large number of concurrent queries.

For example, first consider the end-to-end processing of a single fact tuple through the Cjoin operator. Once a tuple is initialized in the Preprocessor, its processing may involve K probes and K bit-vector AND operations in the worst case, where K is the total number of Filters in the pipeline. Since the probe and the AND operation have limited complexity, and assuming that the preprocessor may initialize efficiently the bit-vector of the tuple, Cjoin may sustain a high throughput between the continuous scan and the aggregation operators. Moreover, the reliance on sequential scans as the sole access method allows Cjoin to scale gracefully to large data sets, without incurring any maintenance costs (e.g., creation of indices or materialized views on the fact table or computation of statistics).

Cjoin may also enable a stable processing time for all queries in the workload. More concretely, the response time of a query evaluated with CJOIN may be dominated by the time required to loop around the continuous scan, which in turn may be relatively stable with respect to the total number of queries in the workload. The reason may be that the I/O is shared across all queries and the cost of probing in each Filter (cost of a hash table lookup and cost of a bit-AND) may grow at a low rate with the number of queries. Thus, as long as the rate of query submission may not surpass the rate of query completion, CJOIN may yield response times with low variance across different degrees of concurrency.

Since the response time of a query evaluated with CJOIN may be dominated by the time required to loop around the continuous scan, the current point in the continuous scan may serve as a reliable progress indicator for each registered query. This progress indicator may also be translated to an estimated time of completion based on the current processing rate of the pipeline. Both of these metrics may provide valuable feedback to users during query execution, which is especially useful for ad-hoc analytic queries over large data warehouses.

Query Admission and Finalization

Up to this point, the processing of fact tuples may have been examined assuming that the CJOIN pipeline has been initialized correctly with respect to a given workload. In this section, how the state of the CJOIN pipeline is updated when a new query is admitted or an existing query finishes its processing is discussed. The variable n maybe used to denote the id of the affected query, and without loss of generality, it is assumed that $n \leq \text{maxId}(Q_s)$.

---

Algorithm 1: Admitting a new query to the CJOIN pipeline.
Input: Query $Q_n$.
Data: A list L of hash dimension tables.
  1. Let D be the set of dimension tables referenced by $Q_n$;
  2. Let D' be the set of dimension tables in the pipeline;
  3. foreach $D_j \in D \cup D'$ do
  4.     if $D_j$ is not in the pipeline then
  5.        Initialize $HD_j$;
  6.        $b_{Dj}[i] = 0$ for all $1 \leq i \leq \text{maxConc}$;
  7.        foreach $Q_i \in Q_s$
  8.           $b_{Dj}[i] = 1$;
  9.        Append $HD_j$ to L;
10.     else if $D_j$ is referenced by $Q_n$ then
11.        $b_{Dj}[n] = 0$;
12.     else
13.        $b_{Dj}[n] = 1$;
14. foreach $D_j \in D$ do
15.     foreach $\delta \in \sigma c_{nj}(D_j)$ do
16.        if $\delta$ is not in $HD_j$ then
17.           Insert $\delta$ in $HD_j$;
18.           $b\delta \leftarrow b_{Dj}$;
19.        $b_\delta[n] \leftarrow 1$;
20. Stall Preprocessor;
21.   foreach $HD_j$ in L do insert a Filter for $HD_j$;
22. $Q \leftarrow Q_s \cup \{Q_n\}$;
23. Set start of $Q_n$ to next tuple in Preprocessor's input;
24. Append a control tuple $\tau_{Qn}$ in Preprocessor's input;
25. Resume Preprocessor;

---

Admitting New Queries

The registration of $Q_n$ may be done through the Pipeline Manager, which may orchestrate the update of information in the remaining components. This approach may take advantage of the parallel execution of the Pipeline Manager and the CJOIN pipeline in order to minimize the disruption in the processing of fact tuples.

The registration may be performed in the Pipeline Manager thread using Algorithm 1. The first step may be to update bit n of $b_{Dj}$ for each dimension table that is referenced by $Q_i$ or appears in the pipeline (line 3). Subsequently, the algorithm may update the hash tables for the dimensions referenced in the query (line 11). For each such dimension table $D_j$, the Pipeline Manager may issue the query $\sigma c_{nj}(D_j)$ and update HD$_j$ with the retrieved dimension tuples. If a retrieved tuple δ is not already in HD$_j$, then δ may be inserted in HD$_j$ and its bit-vector may be initialized to b$_{Dj}$. Next, b$_δ$[n]←1 may be set to indicate that δ is of interest to Q$_n$. Overall, at the end of these updates, all the dimension hash tables may be up to date with respect to the workload Q$_s$ ∪ {Q$_n$}.

Having updated the dimension tables, the algorithm may complete the registration by installing Q$_n$ in the Preprocessor and the Distributor. This may involve several steps. First, the Pipeline Manager may suspend the processing of input tuples in the Preprocessor, which may stall the pipeline. This may enable the addition of new Filters in the pipeline to cover the dimension tables referenced by the query. (New Filters may be appended in the current pipeline, but their placement may change as part of the run-time optimization) Q$_s$ may also be updated to include Q$_n$, which may allow bit n of the fact tuple bit-vector to be initialized correctly. Next, the first unprocessed input fact tuple, say τ, may be marked as the first tuple of Q$_a$, so that it is possible to identify the end of processing Q$_n$ (see next paragraph). Finally, a special "query start" control tuple τn that contains Q$_n$ may be appended in the output queue of the Preprocessor and the Preprocessor may be resumed.

The control tuple may precede the starting tuple τ in the output stream of the Preprocessor and may be forwarded without filtering through the Filters and on to the Distributor. In turn, the latter uses the information in τQ$_n$ to set up the aggregation operators for Q$_n$. Since τ$_{Qn}$ precedes any potential results for Q$_n$ (the pipeline preserves the ordering of control tuples relative to data tuples), the aggregation operators may not miss any relevant fact tuples.

It may be important to note that query registration occurs in the Pipeline Manager thread and thus it may proceed, up to line 17, in parallel to the processing of fact tuples through the pipeline. This ensures that other queries may be minimally disrupted during the registration of Q$_n$. The concurrent update of the bit-vectors in dimension hash tables does not compromise the correctness or results either, since the Preprocessor continues to mark each fact tuple as irrelevant to query Q$_n$ (b$_τ$[n]=0). Thus, even if b$_δ$[n] may be switched on for some tuple δ, it does not lead to the generation of results for Q$_n$ until after it becomes part of the workload in line 19.

Finalizing Queries

Query Q$_n$ may be finalized when the continuous scan wraps around the starting fact tuple τ. Upon encountering τ in its input, the Preprocessor first removes Q$_n$ from Q$_s$, which ensures that the bit-vector of τ (and of any subsequent tuple) may have bit n switched off. This ensures that Q$_n$ becomes irrelevant for the filtering of fact tuples. Subsequently, the Preprocessor emits an "end of query" control tuple that precedes τ in the output stream. The control tuple may be handled similarly as the query-start tuple and may be forwarded through the pipeline to the Distributor, which may finalize the aggregation operators of Q$_n$ and outputs their results. Since the control tuple precedes τ, the aggregation operators of Q$_n$ may not consume any fact tuple more than once.

The final step may be to clear the dimension hash tables from any information pertinent to Q$_n$. This may be handled in the Pipeline Manager thread according to Algorithm 2. The algorithm may essentially reverse the updates performed when the query was admitted. This cleanup may render certain information in the hash tables useless. For instance, if for some tuple δ in HD$_j$ it holds that δ[i]=0, then δ may be removed. In turn, if HD$_j$ becomes empty, then it may be removed from the pipeline along with the corresponding Filter. Of course, the latter may require a stall of the pipeline in order to reconfigure the Filter sequence. Note that this "garbage collection" may be done asynchronously (as long as the query ids may be correctly handled); one could also maintain usage bits and evict the least-recently-used tuples according to memory needs.

---

Algorithm 2: Removing a finished query from the CJOIN pipeline.
Input: Query Q$_n$.
Data: A list L of hash dimension tables.
 1. Let D be the set of dimension tables referenced by Q$_n$;
 2. Let D' be the set of dimension tables in the pipeline;
 3. foreach D$_j$ ∈ D' do
 4.         b$_{Dj}$[n] =1;
 5. foreach D$_j$ ∈ D do
 6.         foreach δ ∈ HD$_j$ do
 7.                 b$_δ$ [n] ← 0;
 8.                 if b$_δ$ = 0 then remove δ from HD$_j$
 9.                 if HD$_j$ = Φ then Append HD$_j$ to L
10. if L ≠ Φ then
11.         Stall pipeline;
12.         foreach HD$_j$ ∈ L do remove corresponding Filter;
13.         Resume pipeline;

---

Correctness

The correctness of CJOIN with respect to query finalization may hinge upon two properties. First, the continuous scan may return fact tuples in the same order once restarted. This may be necessary so that the Preprocessor may identify correctly when the fact table has been scanned exactly once for each query. It may be of course reasonable to expect that this property holds for real-world systems. The second property may be that if a control tuple τ' is placed in the output queue of the Preprocessor before (resp. after) a fact tuple τ, then τ' may not be processed in the Distributor after (resp. before) τ. This property may guarantee that the aggregation operators of a query neither miss relevant tuples nor process them more than once. This property may need to be enforced by the implementation of the CJOIN pipeline.

Pipeline Optimization

The performance of the CJOIN pipeline may be affected by the ordering of Filters, as the latter may determine the expected number of probes for each fact tuple. Drawing a correspondence to the ordering of joins in a single query plan, a good ordering may apply the most selective Filters first in order to drop fact tuples early. The following optimization problem may be stated: Given a workload Q$_s$ and a CJOIN pipeline for Q$_s$, determine an ordering of the Filters that minimizes the expected number of probes for each fact tuple.

One complicating factor may be that the selectivity of each Filter depends on the workload Q$_s$, since a Filter encodes the join predicates on a specific dimension table of several queries. Thus, if the workload is unpredictable, as may be the case of ad-hoc analytics in a data warehouse, then the optimal ordering might change as the query mix changes. This observation may suggest an online approach to optimizing the ordering of Filters in the CJOIN pipeline. The idea may be to monitor at runtime the selectivity of each Filter and then optimize the ordering based on the gathered statistics. This continuous process of monitoring and reoptimizing may be performed inside the Pipeline manager which may be already assumed to execute in a different thread.

Handling Updates

Up to this point, the case of read-only transactions that reference the same data snapshot may have been considered. This may enable grouping all queries of these transactions in the same CJOIN operator that performs a single continuous scan of a specific snapshot. CJOIN may be adapted when this assumption does not hold, e.g., when the queries correspond to transactions with different snapshot ids. This scenario may arise when read-only transactions may be interleaved with updates, and/or when the same transaction contains both queries and updates. In all cases that are examined, updates that reference only the fact table are focused on. In the rare event of updates on dimension tables, it may be assumed that the admission of new queries in CJOIN may be serialized with the transaction of the update.

Two possibilities for adapting CJOIN to this scenario that depend on the functionality of the continuous scan operator are distinguished. The first possibility may be that the continuous scan operator may return all fact tuples corresponding to the snapshots in the current query mix. This essentially may require the scan to expose the multi-version concurrency control information for each fact tuple that it returns. Then, the association of a query $Q_i$ to a specific snapshot may be viewed as a virtual fact table predicate, and it may be evaluated by the Preprocessor over the concurrency control information of each fact tuple. The remaining CJOIN mechanism may remain unchanged. Of course, the benefits of the CJOIN operator may be decreased as the snapshots referenced by the transactions become disjoint, but it may not be clear whether this case may be frequent in practice.

The second possibility may be when the previous functionality may not be provided, e.g., the scan only returns tuples of a specific snapshot. In this case, several CJOIN operators may be created, one for each snapshot that may be referenced, and register queries to the respective operator. This approach may degenerate to a single plan per query, but this may imply a mix of transactions that all reference different snapshot ids.

Parallelization and Scheduling of Dimension Filters

Figure 9:
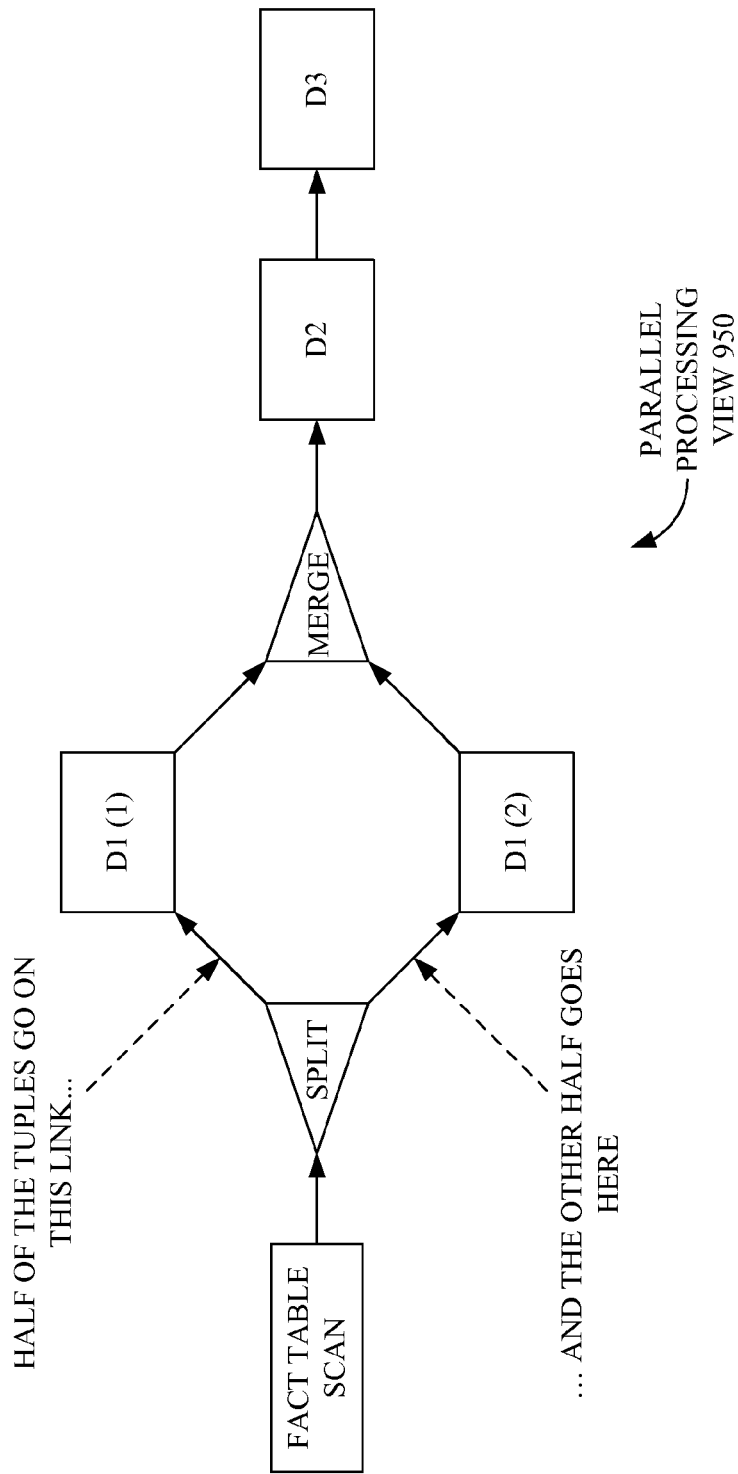
FIG. 9 is a parallel processing view illustrating parallelizing the processing of fact tuples, according to an embodiment.

There may be some value in reordering the dimension filters (e.g., dimension filters 110A-110N of FIG. 1) in order to drop tuples as early as possible. For example: say the ordering of dim filters is normally $D_1$, $D_2$, $D_3$. Let's assume that most of the tuples are dropped after $D_1$. This may make $D_1$ into the bottleneck of the pipeline because it dictates the speed at which processing can move forward. To speed up the pipeline, several instances of the bottleneck filter can be run, on separate cores of the CPUs, as indicated in FIG. 9. Each instance may process half of the incoming fact tuples.

FIG. 9 is a parallel processing view 950 illustrating parallelizing the processing of fact tuples, according to an embodiment. Since each $D_1$ filter receives half of the fact tuples, it can work at a faster rate. This may balance the pipeline and/or increases throughput. This example to ni instances of each $D_i$ filter can be generalized. The choice of the ni values and the order in which the filters may be pipelined turns into a 2-variable optimization problem that may require statistics to estimate the selectivity of each filter. These statistics may be already available in Postgres. The underlying assumption here is that the disk I/O bottleneck does not persist at high levels of concurrency. For example, when processing 500 queries in parallel using a single fact table scan, the pipeline may move at the rate of the disk; through judicious scheduling of the filters to increase to 1000 parallel queries instead of 500.

Mapping the CJOIN Pipeline onto a Multi-Core Architecture

An implementation of CJOIN on a multi-core architecture requires that the operator's components, namely, Preprocessor, Filters, and Distributor, may be mapped to multiple threads, which in turn may be mapped by an operating system to different processor cores. As an example, one mapping may be to assign each component to a different thread and then employ tuple-queues to link the pipeline. However, the mapping of CJOIN components to threads may be required to strike a balance between the degree of parallelism, the overhead of passing tuples between the threads, and the utilization of processor caches. Passing a tuple from one thread to another may require synchronization between the threads and also results in data cache misses if the two threads execute on different cores. On the other hand, executing components in different threads may improve cache locality if the internal state is read-mostly (such as the dimension hash tables) and may be partitioned among multiple threads.

Figure 13:
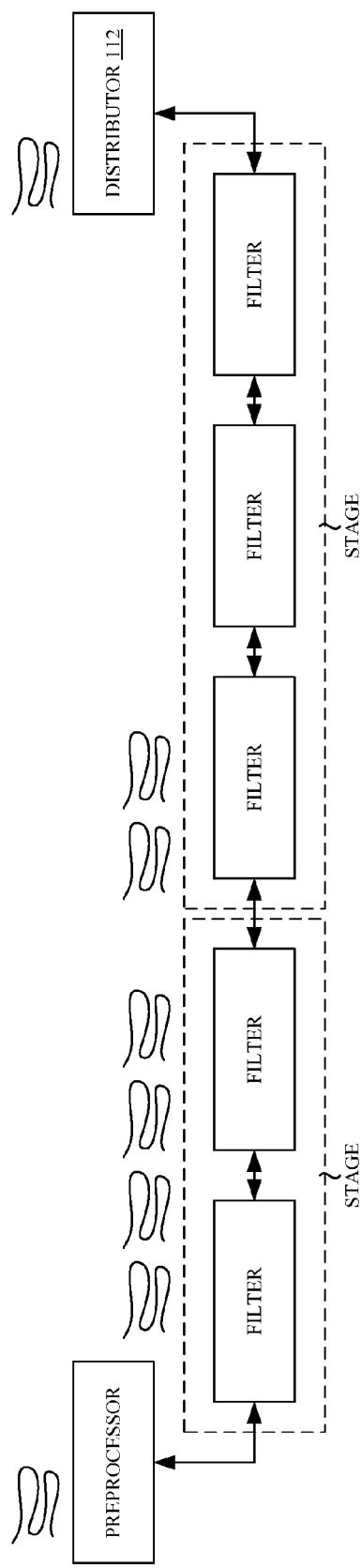
FIG. 13 illustrates that the internal states of the Preprocessor and the distributor may be frequently updates and mapped to a single thread.

Since the internal states of the Preprocessor and Distributor may be frequently updated, each may be mapped to a single thread as shown in FIG. 13. Filters, where the bulk of CJOIN processing may happen, may not have any internal state other than the dimension hash tables, which may be read-mostly. The implementation may allow for a flexible mapping of Filters to threads by collapsing multiple adjacent Filters to a Stage (to minimize the overhead of passing tuples between the threads) and assigning multiple threads to each Stage (to maximize the parallelism). This approach may give rise to the following possible configurations:

A vertical configuration may assign a single Stage to each Filter, with the option of having a different number of threads per Stage. This design may favor the affinity of Stages to cores so that the instruction and data locality may be maximized. On the other hand, a large number of data cache misses may result when tuples may be transferred between Filters. Moreover, the problem of pipeline optimization now may acquire an extra free variable which may be the number of threads per Stage.

A horizontal configuration may assign a single Stage to the complete sequence of Filters and all the threads may be assigned to this single Stage. This may imply that several copies of the Filter sequence may be running in parallel (one for each thread) and accessing the same hash tables. This scheme may avoid data cache misses when tuples may be passed between Filters, but it may incur more misses on the accesses of the hash tables since each thread needs to access more data. The problem of pipeline optimization may involve solely the ordering of Filters.

A hybrid configuration may employ several Stages and an assignment of threads per Stage. This configuration may strike a balance between the two extremes of a horizontal and vertical configuration. More concretely, the cost of tuple passing may be incurred only between Stages, and each thread may need to access solely the dimension tables that exist within a Stage. However, the run-time optimization may become much more complex as there may be now three variables: the ordering of the pipeline, the boxing of Filters in Stages, and the assignment of threads to Stages.

The extra parallelism that may result from using multiple Stages does not outweigh the cost of forwarding the tuples between them. Consequently, the horizontal configuration may be assumed henceforth, and parallelism may be achieved by allocating several threads to the single Stage.

A few design principles may be crucial in achieving good CJOIN performance. An embodiment may reduce the memory management synchronization cost by using a specialized allocator for fact tuples. The specialized allocator may preallocate data structures for all in-flight tuples, whose number may be determined based on the maximum length of a queue and the upper bound on the number of threads. Given the pool of preallocated tuples, the allocator may reserve and release tuples using bitmap operations (which entails a single machine instruction on most CPUs, thus being both atomic and efficient).

An embodiment may reduce the signaling and scheduling overhead by waking up a consuming thread only if its input queue is almost full. Similarly, resume the producer thread only when its output queue is almost empty.

An embodiment may resume the producer thread only when its output queue is almost empty. A locking overhead may be reduced by having each consumer thread retrieve a batch of tuples whenever possible.

There are at least 2 ways to implement CJOIN. The first way is inside Postgres. The fact tuples may be DMA'd from disk into some memory page. To locate the join bitvectors 302 of FIG. 3 next to the fact tuple data structures, a copy from the DMA page to some other page may have to be performed. Instead, the join bitvectors 302 of FIG. 3 may be kept in some other page; this may be done with care, so as to not impact L1 and L2 hit rates. The bitvectors may thus be zeroed out by simply setting the page to zero.

The second way is outside Postgres. Postgres may be asked to scan the fact table using COPY OUT (e.g., the fact table 114 of FIG. 1) and stream it out to an externally implemented version of CJOIN. This could be done in C++, using the good structuring rules; the implementation may achieve isolation from Postgres. The only question mark may be what implication this may have on performance and concurrency control.

Assuming 4 quad-core CPUs per worker, each dimension filter can be run on a separate core. The fact tuples can then be streamed from disk into the L2 cache of the first set of 4 filters, and from there into the L2 cache of the next 4, etc. without ever touching memory; that means performance may be dominated by hashtable access times. The key within L1 and registers may be hashed, to get away with 2 RAM accesses per fact tuple (e.g., one to match the key, another to read the bitvector); with 150 nanosecond random-access latency on RAM that would be 300 nanoseconds per tuple, or perhaps 1 microsecond for 3 tuples.

If fact tuples are 100 bytes, we can fit 10 tuples in 1 KB, so 90 GB of fact data may have 9×108 tuples. If all dimension filters (e.g., dimension filters 110A-110N of FIG. 1) run in parallel, that may mean 10 fact tuples in-flight at any given point in time, 30 fact tuples can be pushed through the system in 1 microsecond. The full fact table (e.g., the fact table 114 of FIG. 1) can thus be processed in 3×107 microseconds, i.e., 30 sec.

Assuming 8 SAS drives per worker, one can expect to stream the fact tuples at approximately 500 MB/sec, making a full fact table scan take 180 seconds (3 minutes). It seems that the computation may be able to keep up with the disk; this means one could answer 1000 analytics queries per 180 seconds, i.e., throughput of about 5.5 queries/second.

The possibility of implementing the CJOIN operator as an external operator may be attractive. A platform can be developed for building external operators (e.g., provide a library with a simple API that can be used for extracting tuples and for doing proper synchronization and isolation). Synchronization challenges with respect to concurrent updates may be overcome (e.g., maintaining proper isolation, guaranteeing consistency of snapshots, etc.). AS OF specifiers may be automatically appended to each query.

In some instances, it may make sense to have a separate SQL command for CJOIN exposed to users. For example, CJOIN could be supported at the workers, and then rely on the queen to decide when it is worth issuing a CJOIN versus another kind of join. In some instances, it might make sense to batch queries at the queen. There may be performance benefits resulting from waiting a little bit (to increase the batch) before sending the batch to the workers. Cache locality may also be optimally exploited through a number of techniques. Since the fact table (e.g., the fact table 114 of FIG. 1) is scanned entirely and dimension tables are read into memory, an append only write model may be supported. In that model, later tuples that have the same key may simply overwrite earlier tuples in the relation. Occasionally this can eliminate duplicates for performance reasons.

Evaluation
Systems

In an embodiment, the CJOIN operator may be implemented as a multi-threaded process executing on top of the PostgreSQL database system. CJOIN may use PostgreSQL to issue queries over the dimension tables for the registration of new queries. The continuous scan may be implemented by issuing successive "SELECT*FROM F" queries to PostgreSQL. To increase the throughput of the scan, a fast tuple copy mechanism between PostgreSQL and CJOIN using a shared memory buffer may be implemented. The prototype may support the horizontal (one Stage for all Filters) and vertical (one Stage per Filter) configurations.

CJOIN may be compared against PostgreSQL and a widely used commercial database system henceforth referred to as "System X". Some rudimentary tuning on both systems (e.g., computation of optimization statistics, allowing a high number of concurrent connections, scans using large chunks of data) may be performed to ensure that the experimental workloads may be executed without obvious performance problems. Both systems may employ the same physical plan structure to evaluate the star queries in the experimental workloads, namely, a pipeline of hash joins that filter a single scan of the fact table.

Data Set and Workload

The data set and queries defined in the Star Schema Benchmark (SSB) may be employed. This particular benchmark may model a particular DW scenario and may target a particular class of queries.

Instances of the SSB data set may be generated using the supplied data generator. The size of each instance may be controlled by a scale factor parameter denoted as sf. A value sf=X results in a data set of size XGB, with 94% of the data corresponding to the fact table.

Workloads of star queries may be generated from the queries specified in the benchmark. More concretely, each benchmark query may be converted to a template by substituting each range predicate in the query with an abstract range predicate, e.g., d_year>=1992 and d_year<=1997 may be converted to d_year>=X and d_year<=Y where X and Y may be variables. To create a workload query, a query template may be sampled and then the abstract ranges may be substituted with concrete predicates based on a parameter s that controls the selectivity of the predicate. Thus, s may enable control of the number of dimension tuples that may be loaded by CJOIN per query, and the size of the hash tables in the physical plans of PostgreSQL and System X.

The original benchmark specification may contain 13 queries of varying complexity. Queries Q1.1, Q1.2 and Q1.3 may have been excluded from the generation of workload queries because they contain selection predicates on fact table attributes and this functionality may not be supported by the prototype. This modification may not affect the usefulness of generated workloads, since omitted queries may be the simplest ones in the SSB benchmark and the only ones that do not have a group-by clause.

Evaluation Metrics

The performance of a system with respect to a specific workload may be measured using query throughput (in queries per hour) and the average and standard deviation of response times for each of the 10 query templates. The standard deviation may be employed to quantify performance stability and predictability.

For each tested system, the workload may be executed using a single client and a cold cache. The degree of query concurrency may be controlled by an integer parameter n, as follows: the client initially submits the first n queries of the workload in a batch, and then submits the next query in the workload whenever an outstanding query finishes. This way, there may be always n queries executing concurrently. To ensure evaluation of the steady state of each system, the above metrics may be measured over queries 256, . . . , 512 in the workload. (n=256 may be the highest degree of concurrency in the experiments.) Measuring a fixed set of queries may allow meaningful comparisons to be drawn across different values of n.

Experiments:

Pipeline Configuration

A comparison of the vertical and horizontal CJOIN configurations that may be supported by the prototype is discussed. Recall that the vertical configuration may map each Filter to a distinct Stage, which may imply that Filters work in parallel to each other. The horizontal configuration boxes substantially all Filters in a single Stage which may be assigned several threads. Thus, each thread may evaluate in parallel the sequence of Filters for a subset of the fact tuples. These configurations represent the two options for mapping the CJOIN operator to a multi-core system.

The performance of each configuration may be evaluated as the total number of threads used in CJOIN is varied. Each configuration may have a minimal number of threads that it needs for its execution, and an upper limit may be set so that each CPU core does not execute more than one "active" thread. More specifically, three cores may be set aside for the PostgreSQL process, and the two threads of the Preprocessor and the Distributor. This may leave five cores out of the eight cores of the experimental machine, and so this number may be used as the upper limit for the number of Stage threads. For the horizontal configuration, all available threads may go to the single Stage. The vertical configuration may require at least four threads (there may be four Filters corresponding to the dimension tables in the SSB data set) and if there is a fifth thread available then it may be assigned to the first Stage.

Figure 14:
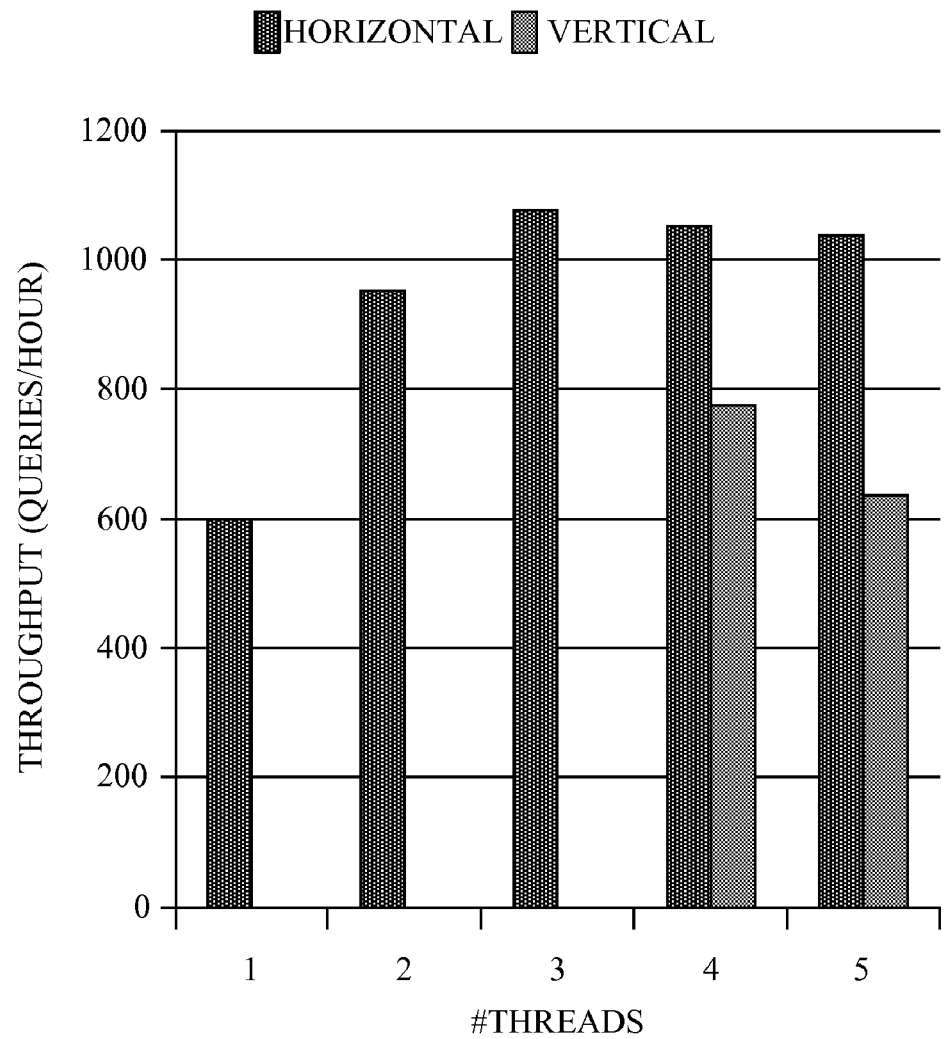
FIG. 14 illustrates the query throughput of two configurations as the number of stage threads are varied, according to one embodiment.

FIG. 14 shows the query throughput of the two configurations as the number of Stage threads are varied, according to an embodiment. The results show clearly that the horizontal pipeline configuration consistently outperforms the vertical configuration as long as it has more than one thread assigned to the single Stage. Therefore, the overhead of passing tuples between threads, which includes L2 data cache misses and thread synchronization, may outweigh the benefits gained by the parallelism of the vertical configuration. Based on these results, the following experiments use the horizontal configuration for the CJOIN operator.

Influence of Concurrency Scale

The next set of experiments evaluates the performance of the three systems as n, the degree of query concurrency, may be increased. Ideally, a system with infinite resources would exhibit a perfect scale-up where an increase of n by a factor k would increase throughput by the same factor. In practice a sublinear scale-up may occur, due to the limited resources and the interference among concurrent queries.

Figure 15:
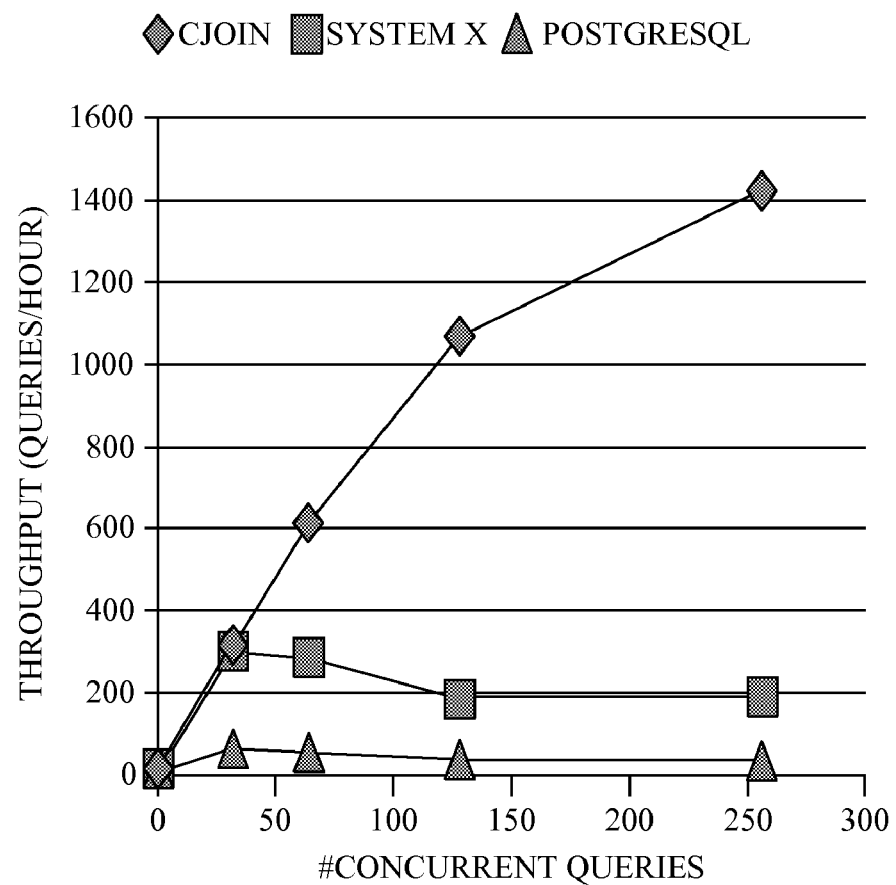
FIG. 15 illustrates the query throughput measurement for three systems as a function of n, according to one embodiment.

FIG. 15 shows the query throughput measurements for the three systems as a function of n, according to an embodiment. (The measurements may be gathered on a 100 GB data set with selectivity s=0.01 per the default parameter values.) An immediate observation may be that CJOIN delivers a significant improvement in throughput compared to System X and PostgreSQL. The improvement may be observed for n≧32 and reaches up to an order of magnitude for n=256. This may be evidence that CJOIN enables a much higher degree of concurrency compared to existing systems.

The results indicate that CJOIN may achieve the ideal linear scale-up for 1≦n≦128. Increasing n from 128 to 256 may result in a sublinear query throughput increase by a factor of 1.33. A profiling of the CJOIN executable may indicate that bitmap operations occupied an inordinately large fraction of runtime for this particular n. The sublinear scale-up may be due mostly to the specific bitmap implementation that was employed. Since the efficiency of bitmap operations may be crucial for CJOIN's scalability, the bitmap implementation in the next version of the prototype may be replaced.

Unlike CJOIN, the query throughputs of System X and PostgreSQL actually decrease when the number of concurrent queries increases past 32. As expected, this decrease may be a consequence of an increased competition among all concurrently executing queries for both I/O bandwidth (for scan) and main memory (for hash tables).

The predictability of each system with respect to query response time is examined next. A system with a predictable performance delivers a constant query response time independently of the number of concurrently executing queries. To quantify this notion of stability, the response times of queries generated from the template corresponding to SSB query Q4.2 may be measured. Query Q4.2 may be one of the more complex queries in the benchmark, as it joins with more dimension tables than most other queries and the cardinality of its Group-By may be among the largest. The results may have remained qualitatively the same for the other templates in the benchmark.

Figure 16:
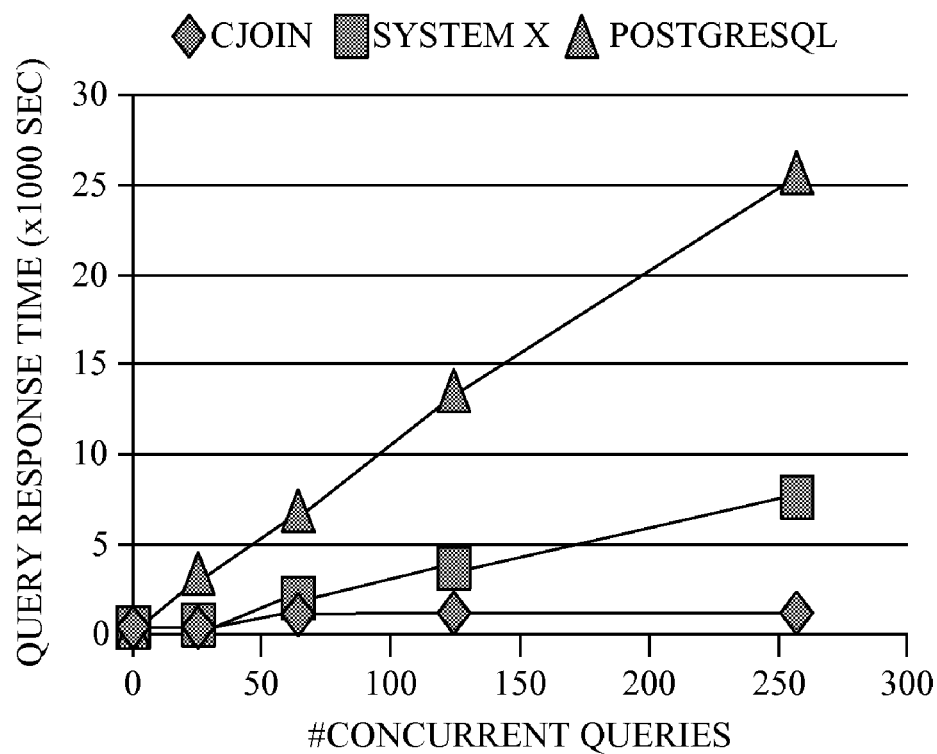
FIG. 16 illustrates the average response time for queries conforming to template Q4.2 as a function of n, according to one embodiment.

FIG. 16 shows the average response time for queries conforming to template Q4.2 as a function of n, according to an embodiment. When increasing the number of concurrent queries n from 1 to 256, the response time of System X grows by a factor of 19 and the response time of PostgreSQL grows by a factor of 66. These may be precisely the undesirable performance patterns that lead to "workload fear" in existing DW platforms. CJOIN response time, on the other hand, grows by less than 30%, which may be a small degradation in performance if one takes into account that the number of queries grows by more than 100. The measurements of deviation indicate that all systems deliver relatively stable query response times in steady state, although CJOIN may again be the clear winner. More specifically, the standard deviation of the response time may be within 0.5% of the average for CJOIN, 5% for System X, and 9% for PostgreSQL respectively.

The overhead of query submission in CJOIN may be quantified as n is varied. Queries matching template Q4.2 may be focused on, and the total time from the submission of the query up until the point the "star query" control tuple may be inserted in the pipeline may be measured. This period may represent the interval during which the submitted query competes for resources with the remainder of the pipeline.

FIG. 19 shows that the time to submit a query may not depend on the number of active queries in CJOIN. Moreover, the "interference" interval may be miniscule compared to the total execution time of each query, and thus it may be concluded that the overhead of registering a query may be negligible.

Influence of Predicate Selectivity

In the next set of experiments, the performance of the three systems may be evaluated as s, the selectivity of the query template predicates may be increased. Increasing s forces all evaluated systems to access more data to answer queries. Therefore, the performance may be expected to degrade at least linearly with s. However, several factors may contribute to a super-linear degradation: hash tables may not fit into L2 caches, System X and PostgreSQL may trash by excessively moving hash buckets between memory and disk.

Figure 17:
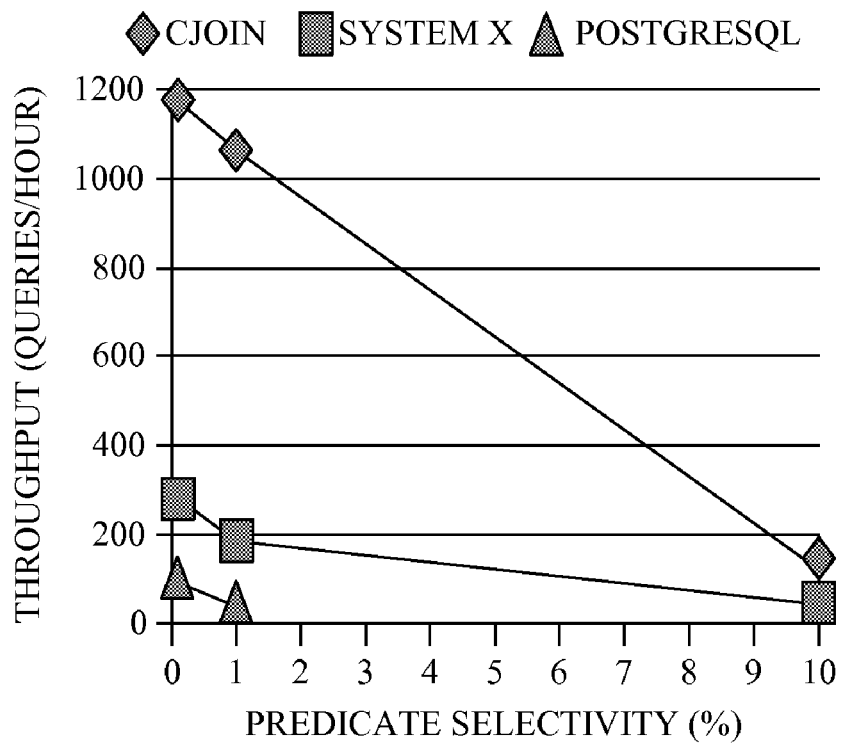
FIG. 17 illustrates the query throughput measurements for the three systems as a function of s, according to one embodiment.

FIG. 17 shows the query throughput measurements for all three systems as a function of s. (The measurements may be gathered on a 100 GB data set with number of concurrent queries n=128 per the default parameter values.) First, CJOIN may be observed to continue to outperform System X and PostgreSQL for all settings of s. However, the gap may be reduced when s=10%. Second, query throughputs of CJOIN and System X may drop approximately linearly with s. Therefore, CJOIN may react predictably to changes in workload selectivity.

The overhead of CJOIN query submission may be expected to grow with s. When s increases, it may be more expensive to evaluate the predicates of newly submitted queries. The dimension hash tables also grow larger and hence it may be more expensive to update them when a new query arrives. On the other hand, there may be fixed costs of new query admission that do not depend on s, including the delay to submit predicate queries to PostgreSQL, to disconnect and drain the pipeline and to update the bookkeeping that tracks active queries in the system.

As shown in FIG. 20, the time to submit a new query may not be proportional to s. Therefore, the factors independent of s may be significant for s≦1%. At the same time, it may be clear that the factors dependent on s become dominant for s=10%.

Influence of Data Scale

In the next set of experiments the performance of the three systems may be evaluated as sf, the scale factor that controls the size of the SSB data set may be increased. Ideally, query throughput should remain inversely proportional to sf. Queries should take k times longer to complete on a k times larger data set, reducing query throughput by a factor of k. Consequently, one can expect the normalized query throughput, defined as a product of query throughput and sf, to remain approximately constant as sf increases. The influence of data scale on query submission overhead may be shown in results in which for scale factors of 1, 10, and 100, submission times may be 0.4, 0.7, and 2.4 seconds, and response times may be 18.8, 105.1, and 759.0 seconds, respectively.

Figure 18:
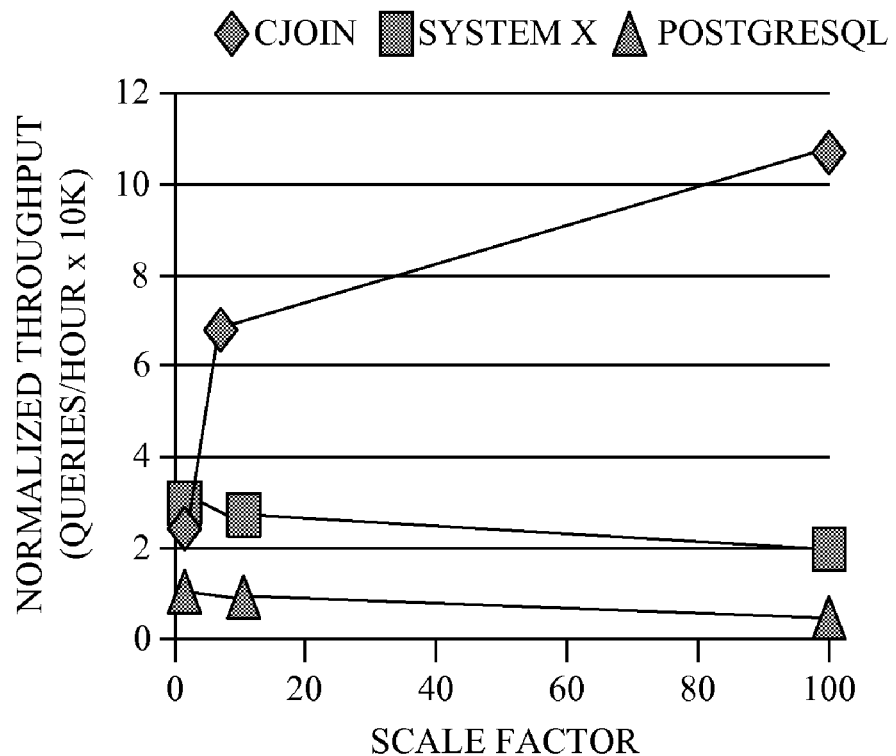
FIG. 18 illustrates the query throughput measurements for the three systems as a function of sf, according to one embodiment.

FIG. 18 shows the query throughput measurements for the three systems as a function of sf, according to an embodiment. (The measurements may be collected with a workload of selectivity s=1% and n=128 concurrently executing queries per the default parameter values.) First, CJOIN may outperform System X for sf≧1% and PostgreSQL for all values of sf. Moreover, the performance gap increases with sf: CJOIN delivers only 85% of query throughput of System X when sf=1, but outperforms System X by a factor of 6 when sf=100. Similarly, CJOIN outperforms PostgreSQL by a factor of 2 when sf=1, but a factor of 28 when sf=100.

The normalized query throughput of CJOIN may actually increase with sf. As shown in FIG. 21, the overhead of query submission in CJOIN may drop relative to the query response time as sf increases. The fixed overhead of query submission (e.g., pipeline disconnection, submission of predicate queries to PostgreSQL) may become less significant as query response time grows with sf. The overhead dependent of dimension table size (e.g., evaluating dimension table predicated and updating dimension hash tables) may not grow linearly with sf because some SSB dimension tables may be of fixed size (date) and some grow only with a logarithm of sf (supplier and customer). Consequently, the cost of query submission may become less significant as sf increases. (In FIG. 21). On the other hand, the normalized query throughput of System X and PostgreSQL may decrease with sf. Both systems do not scale query throughput proportionally with sf because the entire data set may be memory resident when sf=1.

Conventional data warehouses may employ the query-at-a-time model, where each query may be mapped to a distinct physical plan. This model may introduce contention when several queries are executing concurrently, as the physical plans may compete mutually-unaware for access to the underlying I/O and computational resources. Hence while modern systems may efficiently optimize and evaluate a single complex data analysis query, their performance may suffer significantly when running multiple complex queries run concurrently.

Here, a novel query engine architecture is described that may address the problem of limited throughput in large-scale data warehouses. In contrast to the conventional query-at-a-time model, the described engine may aggregate computation of substantially all queries in the system using an "always-on" pipeline of non-blocking operators. The pipeline may be coupled with a controller that continuously examines the current mix of queries and performs run-time optimizations. It is shown that this design may allow the engine to scale gracefully to large data sets, providing predictable execution times along with reduced contention. The design of the query engine and its operators is detailed, and a prototype implementation is empirically evaluated. For tens to hundreds of concurrent queries, the prototype may outperform conventional systems by an order of magnitude.

A method, apparatus and system of an operator for high-concurrency query processing is disclosed in the preceding description. For the purposes of explanation, numerous specific details are set forth in order to provide a thorough understanding of the various embodiments. Although the present embodiments have been described with reference to specific example embodiments, it may be evident that various modifications and changes may be made to these embodiments without departing from the broader spirit and scope of the various embodiments. For example, the various aspects and embodiments described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated (ASIC) circuitry and/or in other circuitry).

Particularly, the various elements described in FIGS. 1-21 may be enabled using software and/or using transistors, logic gates, and electrical circuits (e.g., application specific integrated ASIC circuitry) using one or more of the technologies described herein. In addition, it may be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method comprising:
concurrently executing a set of multiple queries, through a processor, to improve a resource usage within a data warehouse system;
permitting a group of users of the data warehouse system to simultaneously run a set of queries;
applying a high-concurrency query operator to continuously optimize a large number of concurrent queries for a set of highly concurrent dynamic workloads;
efficiently evaluating the set of queries through the high-concurrency query operator;
increasing a query throughput and adjusting a query response time when the number of concurrent queries increases;
sharing a set of resources associated with the data warehouse system across the set of queries;
limiting a redundancy of a workload by answering the set of queries during a first scan of a fact table;
reducing an output time and a set of costs associated with a corresponding set of results of the set of queries;

assigning a unique positive identifier information to a particular query in the set of queries when the particular query registers with the operator;

reusing the unique positive identifier information after an evaluation of the particular query is complete; and utilizing a set of system parameters to organize, denote and bound the set of concurrent queries;

wherein the high concurrency query operator is a physical operator that allows a high-concurrency in a query and other queries that involve at least one of a JOIN operator; and wherein the set of resources associated with the data warehouse system is at least one of a disk I/O resource, a computation resource, and an in-memory data resource.

2. The method of claim 1, further comprising:

applying the high concurrency query operator to a set of star queries, wherein a star query filters the fact table through a set of dimension predicates.

3. The method of claim 2, further comprising:

continuously performing a scan of the fact table; and utilizing a pipeline to receive an input from a continuous scan of the fact table and to pipe an output to set of aggregation operators to compute a set of results associated with the set of queries, wherein the pipeline comprises of at least one of a preprocessor, a filter, a pipeline manager and a distributor.

4. The method of claim 3, further comprising:

processing a fact tuple through a special filter designated for a particular dimension table, wherein the fact tuple is a sequence of a specific number of values gathered from a set of dimension tables.

5. The method of claim 4, further comprising:

marking, through the preprocessor, a particular point where a given query enters the high-concurrency query operator;

signaling, through the preprocessor, a completion of the given query when the continuous scan of the fact table wraps back to the particular point; and receiving from the continuous scan and forwarding, through the preprocessor, a set of fact tuples to a remainder of the pipeline.

6. The method of claim 5, further comprising:

augmenting the fact tuple with a bit vector containing a bit for at least one query in a given workload.

7. The method of claim 6, further comprising:

receiving, examining and subsequently routing to at least one aggregation operator, a set of relevant fact tuples for at least one query in the given workload through the distributor.

8. The method of claim 7, further comprising:

storing a tuple of the particular dimension table that satisfies a set of corresponding dimension predicates in a dimension hash table.

9. The method of claim 8, further comprising:

applying the filter to encode the set of corresponding dimension predicates associated with the set of queries; and probing, through the filter, a corresponding dimension hash table to identify a set of joining dimension tuples.

10. The method of claim 9, further comprising:

designating one of at least two values for the bit vector based on a predefined criteria if the value of a joining dimension tuple corresponds to a foreign key value of a specific fact tuple;

designating another one of at least two values for the bit vector based on the predefined criteria if the value of the joining dimension tuple does not correspond to the foreign key value of the specific fact tuple; and discarding the specific fact tuple when the value of the joining dimension tuple does not correspond to the foreign key value of the specific fact tuple.

11. The method of claim 10, further comprising:

applying the pipeline manager to regulate an operation of the pipeline, to register a new query with the high-concurrency query operator and to clean up after an execution of a set of registered queries;

monitoring a performance of the pipeline and optimizing the performance of the pipeline as needed to maximize the query throughput through the pipeline manager; and utilizing a separate execution context for the pipeline manager.

12. The method of claim 11, further comprising:

sharing the fact table among the set of queries;

filtering an individual fact tuple against the set of queries with a single dimension table probe to generate a set of dimension tuples for the individual fact tuple; and storing a union of the dimension tuples.

13. The method of claim 12, further comprising:

permitting a change in an order in which a sequence of filters is applied; and permitting a set of filter operators to run in parallel.

14. The method of claim 13, further comprising:

associating a corresponding dimension filter with a dimension table; and annotating the fact tuple based on a set of join properties associated with the fact tuple and the dimension table.

15. The method of claim 14, further comprising:

performing an update on the dimension hash table, through a dimension preprocessor when the new query is introduced;

reading and augmenting the fact tuple with a set of necessary metadata through a fact preprocessor;

applying a set of dimension filters to the fact tuple;

annotating the fact tuple, through at least one dimension filter of the set of dimension filters; and applying the distributor to receive the annotated fact tuple and to distribute a copy of the fact tuple into a result set of the new query.

16. The method of claim 15, further comprising:

mapping a particular dimension table on the dimension hash table when the particular dimension table is referenced by at least one query in the set of queries;

storing a set of dimension tuples associated with the particular dimension table in the dimension hash table to be selected by at least one query in the workload; and storing a particular dimension tuple exactly one time regardless of a number of queries referencing the particular dimension tuple.

17. The method of claim 16, further comprising:

augmenting the particular dimension table with a selection predicate, through the dimension preprocessor; and propagating an information associated with the selection predicate to the set of dimension tuples, through the dimension preprocessor, when the new query is introduced.

18. The method of claim 17, further comprising:

updating a corresponding predicate bitvector when the new query is introduced; and utilizing a static structure architecture to implement the dimension hash tables to improve a cache hit rate.

19. The method of claim 18, further comprising:

including a pointer in the corresponding predicate bitvector to improve a hit rate of an L1 and an L2 cache memory.

* * * * *